United States Patent
Hara

(10) Patent No.: US 11,568,074 B2
(45) Date of Patent: Jan. 31, 2023

(54) MEMORY SYSTEM

(71) Applicant: Kioxia Corporation, Tokyo (JP)

(72) Inventor: Keigo Hara, Kamakura Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 669 days.

(21) Appl. No.: 16/549,506

(22) Filed: Aug. 23, 2019

(65) Prior Publication Data

US 2020/0293676 A1 Sep. 17, 2020

(30) Foreign Application Priority Data

Mar. 12, 2019 (JP) ............... JP2019-044960

(51) Int. Cl.
| | |
|---|---|
| *G06F 21/62* | (2013.01) |
| *G06F 3/06* | (2006.01) |
| *G06F 11/10* | (2006.01) |

(52) U.S. Cl.
CPC ........ *G06F 21/6218* (2013.01); *G06F 3/0622* (2013.01); *G06F 3/0659* (2013.01); *G06F 3/0679* (2013.01); *G06F 11/1004* (2013.01)

(58) Field of Classification Search
CPC .. G06F 21/6218; G06F 3/0622; G06F 3/0659; G06F 3/0679; G06F 11/1004
See application file for complete search history.

(56) References Cited

U.S. PATENT DOCUMENTS

| | | | |
|---|---|---|---|
| 9,507,722 B2 | 11/2016 | Desai | |
| 10,108,371 B2 | 10/2018 | Nimmagadda | |
| 2016/0231803 A1 | 8/2016 | Iwai | |
| 2017/0255508 A1* | 9/2017 | Lee | G06F 11/1016 |
| 2018/0039541 A1* | 2/2018 | Hahn | G06F 11/108 |
| 2018/0107614 A1 | 4/2018 | Hong | |

FOREIGN PATENT DOCUMENTS

KR 20170031830 A * 9/2015 ......... G11C 14/0018

* cited by examiner

*Primary Examiner* — Matthew Smithers
*Assistant Examiner* — Shu Chun Gao
(74) *Attorney, Agent, or Firm* — Foley & Lardner LLP

(57) ABSTRACT

According to one embodiment, a memory system is connectable to a host including a first volatile memory and includes a non-volatile memory and a controller. The controller may use a first area of the first volatile memory as a temporary storage memory of data stored in the non-volatile memory and controls the non-volatile memory. The controller generates a first parity by using first data stored in the non-volatile memory and a key value to store the first data and the generated first parity in the first area. In the case of reading the first data stored in the first area, the controller reads the first data and the first parity to verify the read first data using the read first parity and the key value.

16 Claims, 16 Drawing Sheets

FIG. 6

| DATA TYPE | CONTENT | CACHE POSSIBILITY |
|---|---|---|
| USER DATA | ENCRYPTED | POSSIBLE |
| | NOT ENCRYPTED | NOT POSSIBLE |
| SYSTEM DATA | SECURITY KEY | NOT POSSIBLE |
| | FIRMWARE | NOT POSSIBLE |
| | LOGICAL-TO-PHYSICAL ADDRESS CONVERSION TABLE | POSSIBLE |
| | OPERATION LOG OF SSD | POSSIBLE |
| | ⋮ | ⋮ |

MEMORY SYSTEM

CROSS-REFERENCE TO RELATED APPLICATION(S)

This application is based upon and claims the benefit of priority from Japanese Patent Application No. 2019-044960, filed Mar. 12, 2019, the entire contents of which are incorporated herein by reference.

FIELD

An embodiment described herein relates generally to a memory system including a non-volatile memory.

BACKGROUND

In recent years, memory systems including non-volatile memories are widely used.

As one of such memory systems, a solid-state drive (SSD) including a NAND flash memory is known. SSDs are used as main storage for various computing devices.

SSDs may support a host memory buffer (HMB) function for using a part of a random-access memory (RAM) provided in a host as a temporary storage area. The area of RAM in the host, which is used as a temporary storage area, is also called HMB. Not only the RAM provided in the SSD but also the HMB is used as a temporary storage area, thereby speeding up the processing of the SSD.

An example of related art includes US-A-2016/0231803.

DESCRIPTION OF THE DRAWINGS

FIG. 6 is a diagram showing an example of conditions used for the determination of FIG. 5;

DETAILED DESCRIPTION

Embodiments provide a memory system that can enhance security when an HMB is used.

In general, according to one embodiment, a memory system is disclosed. The memory system can be used with a host that includes a first volatile memory. The memory system includes a non-volatile memory and a controller. The controller can cause a first area of the first volatile memory to temporarily store data from the non-volatile memory. The controller can generate a first parity using first data stored in the non-volatile memory and a key value to store the first data and the generated first parity in the first area. The controller can read the first data and the first parity stored in the first area to verify the read first data using the read first parity and the key value.

Hereinafter, embodiments will be described with reference to drawings.

Figure 1:
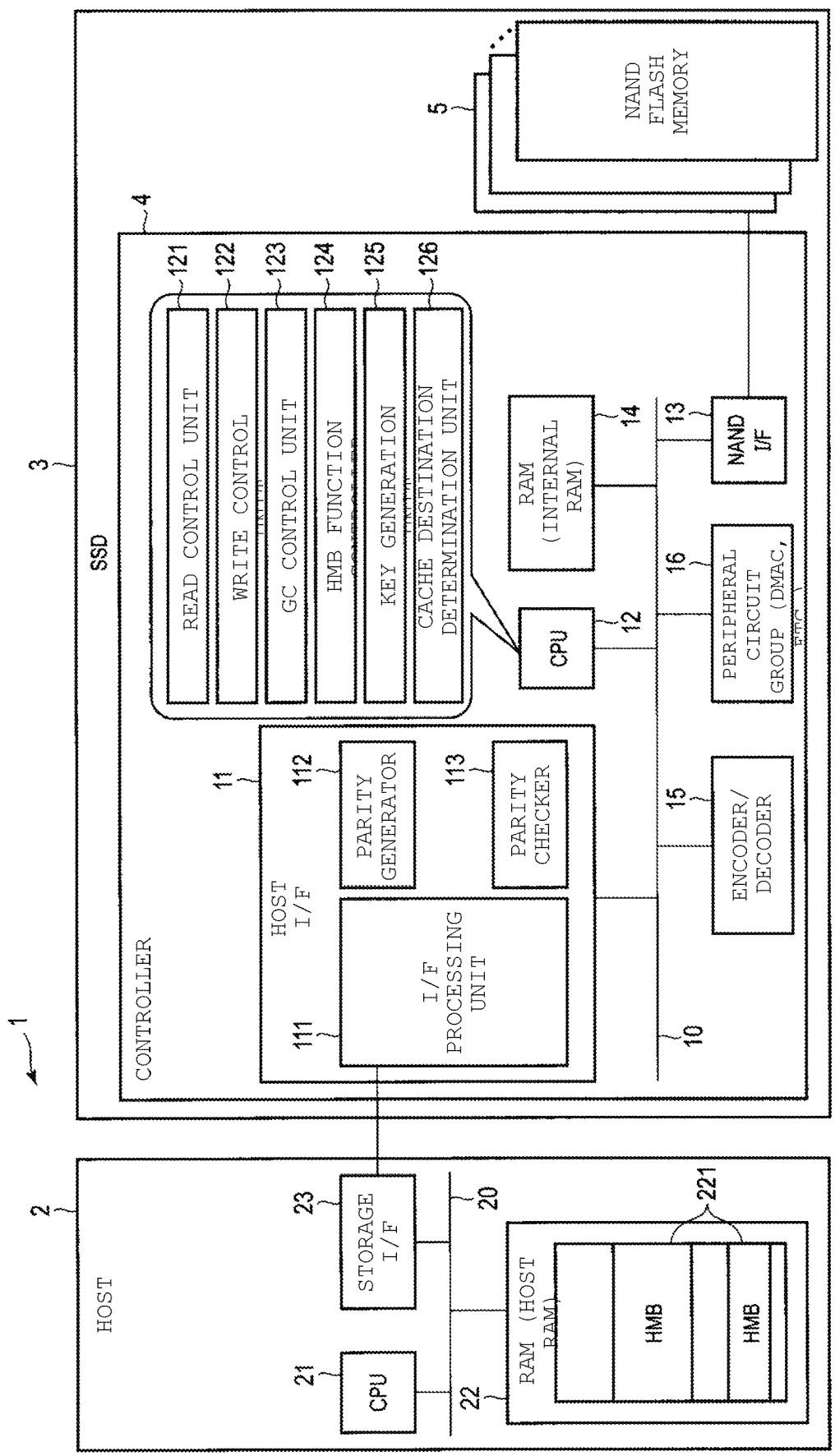
FIG. 1 is a block diagram showing a configuration example of an information processing system including a memory system according to an embodiment.

First, the configuration of an information processing system 1 including a memory system according to an embodiment will be described with reference to FIG. 1.

This memory system is a semiconductor storage device configured to write data in a non-volatile memory such as a NAND flash memory 5 and read data from the non-volatile memory and is also simply referred to as a storage device. This memory system is implemented, for example, as a solid-state drive (SSD) 3 including the NAND flash memory 5. Hereinafter, although a case where the memory system (that is, storage device) is implemented as the SSD 3 is illustrated, the memory system may be implemented as a hard disk drive (HDD). Alternatively, the memory system may be a storage device in which a controller and the NAND flash memory 5 are configured as one package.

The information processing system 1 includes a host device 2 (hereinafter, also referred to as a host) and the SSD 3. The host 2 may be a storage server that stores a large amount of various data in the SSD 3 or may be a personal computer.

The SSD 3 may be used as a storage of an information processing device functioning as the host 2. The SSD 3 may be embedded in the information processing device or may be connected to the information processing device via a cable or a network.

As an interface for interconnecting the host 2 and the SSD 3, for example, NVM Express (NVMe) (registered trademark) or Universal Flash Storage (UFS) may be used.

The host 2 includes a CPU 21, a random access memory (RAM) 22, a storage interface 23, and the like. The CPU 21, the RAM 22, and the storage interface 23 may be interconnected via a bus 20. The host 2 is connected to the SSD 3 via the storage interface 23 corresponding to the interface standard for interconnecting the host 2 and the SSD 3 described above.

The CPU 21 is a processor configured to control each unit in the host 2. The CPU 12 executes various processing by executing a basic input/output system (BIOS) and an operating system (OS) stored in a ROM (not shown) or the like.

The RAM 22 is a temporary storage area (also referred to as a work area) for temporarily storing various data used by the CPU 12. The RAM 22 may be a dynamic RAM (DRAM) or a static RAM (SRAM). Hereinafter, the RAM 22 in the host 2 is also referred to as a host RAM 22.

The SSD 3 includes a controller 4 and the NAND flash memory 5. The controller 4 may be implemented by a circuit such as a system-on-a-chip (SoC).

The controller 4 includes a RAM 14. The RAM 14 is a temporary storage area for temporarily storing data used by the controller 4. The RAM 14 may be a DRAM or an SRAM. The RAM 14 may be provided outside the controller 4. In that case, the controller 4 accesses the RAM 14 via an interface provided in the controller 4.

The RAM 14 may include a buffer area for temporarily storing data to be written to the NAND flash memory 5 and data read from the NAND flash memory 5, and a cache area of a look-up table (LUT) that functions as a logical-to-physical address conversion table. The LUT manages the mapping between each logical address (for example, logical block address (LBA)) and each physical address of the NAND flash memory 5. Furthermore, the RAM 14 may include a storage area of various data used for processing by the SSD 3 such as a security key (for example, encryption/decryption key for encrypting and decrypting user data), firmware (FW) which is a control program executed by the CPU 12, and an operation log of the SSD 3. Hereinafter, the RAM 14 in the SSD 3 is also referred to as an internal RAM 14. The user data is data for which writing is instructed from the host 2 to the SSD 3, and is data specified by a write request (for example, a write command) from the host 2. In response to the acceptance of the write request from the host 2, the SSD 3 receives user data associated with the write request from the host 2.

The controller 4 may further support a host memory buffer (HMB) function. For example, the SSD 3 conforming to the NVMe standard may support the HMB function. The HMB function is a function for the controller 4 to exclusively use at least a part of an allocated area in the host RAM 22 as a temporary storage area. The controller 4 may exclusively use a partial area in the host RAM 22 by the HMB function.

Unified Memory Architecture (UMA) which is a memory architecture may be applied as the HMB function. In this case, the SSD 3 may communicate with the host 2 in accordance with the UFS standard to execute the HMB function on a partial area in the host RAM 22 based on Unified Memory Extension (UME) which is a peripheral standard of the UFS standard.

Thus, when the controller 4 supports the HMB function, as an interface for interconnecting the host 2 and the SSD 3 to each other, NVMe with the HMB function or UFS with the HMB function by UME may be used. However, if the controller is standardized to have the HMB function, SCSI, as an interface for interconnecting the host 2 and the SSD 3 to each other, Serial Attached SCSI (SAS), ATA, Serial ATA (SATA), PCI Express (PCIe) (registered trademark), Ethernet (registered trademark), Fibre channel, and the like may be used.

The area allocated to the controller 4 in the host RAM 22 is also referred to as a host memory buffer (HMB) 221. From the time when the HMB function is enabled to the time when the HBM function is disabled, the controller 4 may use the HMB 221 in the host RAM 22 as a temporary storage area provided with a buffer area, a cache area, a storage area of various data, and the like, as the internal RAM 14 described above. For example, when the SSD 3 is started up, the HMB function is disabled, and then, is enabled in response to a request from the host 2.

The controller 4 may receive address information of a list indicating one or more address ranges in the host RAM together with a command requesting to enable the HMB function, from the host 2. The controller 4 may use one or more areas respectively corresponding to the one or more address ranges as the HMB 221 from the time when the HMB function is enabled to the time when HMB function is disabled according to the command.

In the following, for the sake of simplicity, storing (that is, temporary storage) data in the internal RAM 14 or the HMB 221 may be referred to as "caching" regardless of the application of the internal RAM 14 or the HMB 221 such as cache or buffer. The area in the internal RAM 14 and the HMB 221 may be described as a "cache area" regardless of the application of the internal RAM 14 and the HMB 221.

The NAND flash memory 5 includes a plurality of blocks. Each block contains a plurality of pages. One block functions as a minimum erase unit. A block may also be referred to as an "erase block" or "physical block". Each page includes a plurality of memory cells connected to the same word line. One page is a unit of data write operation and data read operation. A word line may be used as a unit of data write operation and data read operation.

There is an upper limit to the number of program/erase cycles (P/E cycles) for each block, which is called the maximum number of P/E cycles. One P/E cycle of a block includes an erasing operation for putting all the memory cells in this block into an erase state, and a write operation for writing data to each page of this block.

The controller 4 is electrically connected to the NAND flash memory 5 via a NAND interface 13 corresponding to an interface standard such as Toggle DDR or Open NAND Flash Interface (ONFI). The NAND interface 13 functions as a NAND control circuit configured to control the NAND flash memory 5. The NAND interface 13 controls, for example, a NAND signal and issues a command.

The NAND interface 13 may be connected to a plurality of NAND flash memory chips in the NAND flash memory 5 via a plurality of channels (Ch). By driving the plurality of NAND flash memory chips in parallel, access to the NAND flash memory 5 can be broadened.

The controller 4 functions as a memory controller configured to control the NAND flash memory 5.

The controller 4 may function as a flash translation layer (FTL) configured to execute data management and block management of the NAND flash memory 5. The data management executed by this FTL includes (1) management of mapping information indicating correspondence between each logical address and each physical address of the NAND flash memory 5, (2) processing for concealing read/write in page units and erasing operations in block units, and the like. The logical address is an address used by the host 2 to address the SSD 3. In the following, it is assumed that a logical block address (LBA) is used as this logical address.

The controller 4 executes management of the mapping between each LBA and each physical address using a logical-to-physical address conversion table. The controller 4 manages the mapping between each LBA and each physical address in a specific management size unit using the logical-to-physical address conversion table. The physical address corresponding to a certain LBA indicates the physical storage location in the NAND flash memory 5 in which the data of this LBA is written. The controller 4 may load the logical-to-physical address conversion table from the NAND flash memory 5 to the internal RAM 14 or to the HMB 221 in the host RAM 22 when the SSD 3 is powered on.

Data may be written to one page only once per P/E cycle. In the case of updating data corresponding to a certain LBA, the controller 4 writes the update data not to a first physical storage location where the data corresponding to this LBA is currently stored, but to a second physical storage location different from the first physical storage location. Then, the controller 4 invalidates the pre-update data stored in the first physical storage location by updating the logical-to-physical address conversion table so as to associate the LBA with the second physical storage location.

Block management includes defective block management, wear leveling, garbage collection (GC) (compaction), and the like.

In order to execute processing for realizing the functions such as address conversion, wear leveling, and GC as described above, the controller 4 functioning as the FTL needs to perform processing for reading and writing a large amount of data such as logical-to-physical address conversion table, system data including internal information of the controller 4, fragmented user data, and the like with respect to the NAND flash memory 5. As a method for efficiently handling such data, there is a method of reading data from the NAND flash memory 5 to a faster primary memory (SRAM, DRAM, and the like). However, mounting a large capacity primary memory as the internal RAM 14 causes an increase in the cost and size of the controller 4.

The HMB function described above may be used as a method for preventing the increase in the capacity of the internal RAM 14. The HMB function allows the controller 4 to use a part of the host RAM 22 as a temporary storage area, thereby speeding up processing such as FTL without increasing the capacity of the internal RAM 14.

The controller 4 may include a host interface 11, the CPU 12, the NAND interface 13, the internal RAM 14, an encoder/decoder 15, a peripheral circuit group 16, and the like. The host interface 11, the CPU 12, the NAND interface 13, the internal RAM 14, the encoder/decoder 15, and the peripheral circuit group 16 may be interconnected via a bus 10.

The host interface 11 functions as a circuit that performs signal control with the host 2 and issues a command. The host interface 11 includes an interface processing unit 111, a parity generator 112, a parity checker 113, and the like. The interface processing unit 111 performs processing in accordance with a protocol defined by an interface for connecting the SSD 3 and the host 2 (for example, the protocol of NVMe). The interface processing unit 111 receives various commands, such as various control commands and I/O commands, from the host 2. The control command may include a command (for example, a Set Features command) requesting to enable/disable the HMB function. The I/O command may include a write command, a read command, and the like. Each command is also referred to as an instruction.

The host 2 transmits a command requesting to enable the HMB function to the SSD 3, for example, in response to switching of the user who uses the host 2, in response to the host 2 being powered on, or in response to the SSD 3 shifting from the power saving mode to the normal mode. This command is, for example, a Set Features command indicating enabling of the HMB function. The host 2 may transmit address information of a list indicating, for example, one or more address ranges in the host RAM 22 together with this command in order to specify an area to be used as the HMB 221 to the SSD 3.

For example, before the user using host 2 is switched, before the host 2 is powered off or before the SSD 3 shifts from the normal mode to the power saving mode, the host 2 transmits a command requesting to disable the HMB function to the SSD 3. This command is, for example, a Set Features command indicating the disabling of the HMB function. The SSD 3 shifts from the normal mode to the power saving mode to reduce power consumption. For example, after writing data stored in a volatile memory such as the internal RAM 14 into the NAND flash memory 5 before shifting to the power saving mode, the SSD 3 stops the power supply to the volatile memory and the NAND flash memory 5. The SSD 3 that has shifted to the power saving mode does not supply power to each unit except for some elements, and therefore power consumption may be reduced.

The interface processing unit 111 sends a request indicating that the HMB function is enabled to the CPU 12 in response to the command requesting to enable the HMB function. The interface processing unit 111 sends address information specifying an area in the host RAM 22 to be used as the HMB 221, to the CPU 12. Thus, the HMB function is enabled by the CPU 12 and the specified area is used as the HMB 221.

The interface processing unit 111 sends a request indicating that the HMB function is disabled to the CPU 12 in response to the command requesting to disable the HMB function. Thereby, the HMB function is disabled by the CPU 12.

The interface processing unit 111 may further transmit data to be cached in the HMB 221 to the host 2 and receives data cached in the HMB 221 from the host 2 from the time when the HMB function is enabled to the time when the HBM function is disabled. In other words, the interface processing unit 111 may perform processing for caching data in the HMB 221 and processing for reading data from the HMB 221 from the time when the HMB function is enabled to the time when the HBM function is disabled. The data to be cached is data that the controller 4 is to cache in the HMB 221 (or the internal RAM 14), and is data that has not yet been cached.

The parity generator 112 uses a key value to generate parity to be added to the data to be cached in the HMB 221. The interface processing unit 111 caches the generated parity and data in the HMB 221. The key value is a random value generated (updated) by the CPU 12 each time the HMB function is enabled, for example. The key value is a unique value for each period from the time when the HMB function is enabled to the time when the HBM function is disabled. For example, the key value used in a first period from the time when the HMB function is enabled to the time when the HBM function is disabled is different from the key value used in the period from the time when the HMB function is enabled to the time when the HBM function is disabled after the first period. Hereinafter, the period from the time when the HMB function is enabled to the time when the HBM function is disabled is also referred to as an enabling period.

When data and parity are read out from the HMB 221, the parity checker 113 uses the key value and the read parity to verify whether or not an error occurs in the read data. The parity generator 112 and the parity checker 113 store key values generated by the CPU 12. Generation of parity using a key value and verification of data using a key value and parity will be described later with reference to FIGS. 8 to 11.

The encoder/decoder 15 encrypts and decrypts user data. For example, the encoder/decoder 15 may encrypt user data to be written to the NAND flash memory 5 via the NAND interface 13 and decode user data to be read from the NAND flash memory 5 via the NAND interface 13. The encoder/decoder 15 encrypts and decrypts user data using, for example, a security key (encryption/decryption key). The security key may be stored in a RAM such as the internal RAM 14 or the like.

The peripheral circuit group 16 includes a circuit for assisting the processing by the CPU 12. The peripheral circuit group 16 includes, for example, a direct memory access controller (DMAC). The interface processing unit 111 in the host interface 11 may perform processing for caching data in the HMB 221 and processing for reading data cached in the HMB 221 according to an instruction from the DMAC.

The CPU 12 is a processor configured to control the host interface 11 and the NAND interface 13. The CPU 12 performs various processing by executing the FW stored in a ROM or the like (not shown). The CPU 12 may execute command processing and the like for processing various commands from the host 2 in addition to the above-described FTL processing. The above-described FW executed by the CPU 12 controls the operation of the CPU 12. Dedicated hardware within the controller 4 may perform some or all of the FTL processing and command processing.

The CPU 12 may function as, for example, a read control unit 121, a write control unit 122, a GC control unit 123, an HMB function control unit 124, a key generation unit 125, and a cache destination determination unit 126.

The read control unit 121 reads user data corresponding to a read command from the NAND flash memory 5. The read control unit 121 may control each unit in the controller 4 so that the read user data is cached in the internal RAM 14 or the HMB 221. That is, the read control unit 121 may use the internal RAM 14 and the HMB 221 as a read buffer for accumulating the read user data.

The write control unit 122 writes the user data received from the host 2 in the NAND flash memory 5 in response to the reception of a write command. The write control unit 122 may control each unit in the controller 4 such that user data to be written to the NAND flash memory 5 is cached in the internal RAM 14 or the HMB 221. That is, the write control unit 122 may use the internal RAM 14 and the HMB 221 as a write buffer for accumulating user data to be written.

The GC control unit 123 may also write user data to the NAND flash memory 5 in the same manner as the write control unit 122. As described above, the NAND flash memory 5 includes a plurality of blocks. The blocks are roughly divided into blocks that store valid data (active blocks) and blocks that do not store valid data and that may be used to write new data through erase processing (free blocks). The GC control unit 123 selects one block from one or more free blocks and performs erase processing on the one block. Then, the GC control unit 123 allocates the block as a write destination block. The write destination block may store valid data.

The GC control unit 123 selects a garbage collection source block (GC source block) from active blocks storing valid data. Then, the GC control unit 123 writes the valid data in the GC source block from the free block group to a garbage collection destination block (GC destination block) selected as a write destination block. At this time, the GC control unit 123 may control each unit in the controller 4 so that valid data in the GC source block is cached in the internal RAM 14 or the HMB 221. That is, the GC control unit 123 may use the internal RAM 14 and the HMB 221 as a GC buffer for accumulating valid data.

The HMB function control unit 124 controls enabling/disabling of the HMB function. As described above, the interface processing unit 111 sends a request that the HMB function is enabled and address information specifying an area to be used as the HMB 221, to the CPU 12. This address information includes a list indicating one or more address ranges in the host RAM 22.

The HMB function control unit 124 enables the HMB function in response to the request indicating that the HMB function is enabled. Then, the HMB function control unit 124 manages one or more areas respectively corresponding to the one or more address ranges as the HMB 221 from the time when the HMB function is enabled to the time when the HBM function is disabled, using address information of a list indicating one or more address ranges in the host RAM 22.

The HMB function control unit 124 uses, for example, HMB area management information to manage the HMB 221. The HMB area management information is cached, for example, in the internal RAM 14. The HMB area management information may include information (for example, a logical address) for identifying data cached in the HMB 221, and information indicating a position (area) in the HMB 221 where the data is cached.

Further, as described above, the interface processing unit 111 sends a request indicating that the HMB function is disabled, to the CPU 12. The HMB function control unit 124 disables the HMB function in response to the request indicating that the HMB function is disabled.

The key generation unit 125 adds parity to the data to be cached in the HMB 221 to generate a key value for verifying the data read from the HMB 221 with the added parity. For example, each time the HMB function is enabled, the key generation unit 125 generates a key value and updates the key value used so far with the newly generated key value. The pre-update key value and the post-update key value are different values, and each includes, for example, a random number. The key generation unit 125 notifies the parity generator 112 and the parity checker 113 in the host interface 11 of the generated key value to update the key value used for addition of parity and data verification with parity.

The cache destination determination unit 126 determines a RAM in which certain data is to be cached. More specifically, the cache destination determination unit 126 determines whether or not certain data may be cached in the host RAM 22 (that is, outside the SSD 3). For example, when data is read from the NAND flash memory 5 for internal processing of the SSD 3 such as GC and system data update processing, the cache destination determination unit 126 determines whether or not the read data may be cached in the host RAM 22 and selects a cache destination (here, either the HMB 221 or the internal RAM 14). The data to be cached is data that is permitted to be cached in a certain RAM.

If certain data is data to be cached in the host RAM 22, the cache destination determination unit 126 determines a cache destination of the data as the HMB 221 in the host RAM 22. On the other hand, if certain data is data not to be cached in the host RAM 22, the cache destination determination unit 126 determines a cache destination of the data in the internal RAM 14. The cache destination determination unit 126 may determine whether or not certain data is data to be cached in the host RAM 22 according to a specific condition based on the type or content of the data. This particular condition will be described later with reference to FIG. 6.

The cache destination determination unit 126 controls each unit in the controller 4 such that data whose cache destination is determined to the internal RAM 14 (that is, data not to be cached to the host RAM 22) is cached in the internal RAM 14. The cache destination determination unit 126 controls each unit in the controller 4 so that data whose cache destination is determined to be the HMB 221 (that is, data to be cached in the host RAM 22) is cached in the HMB 221 via the host interface 11.

Figure 2:
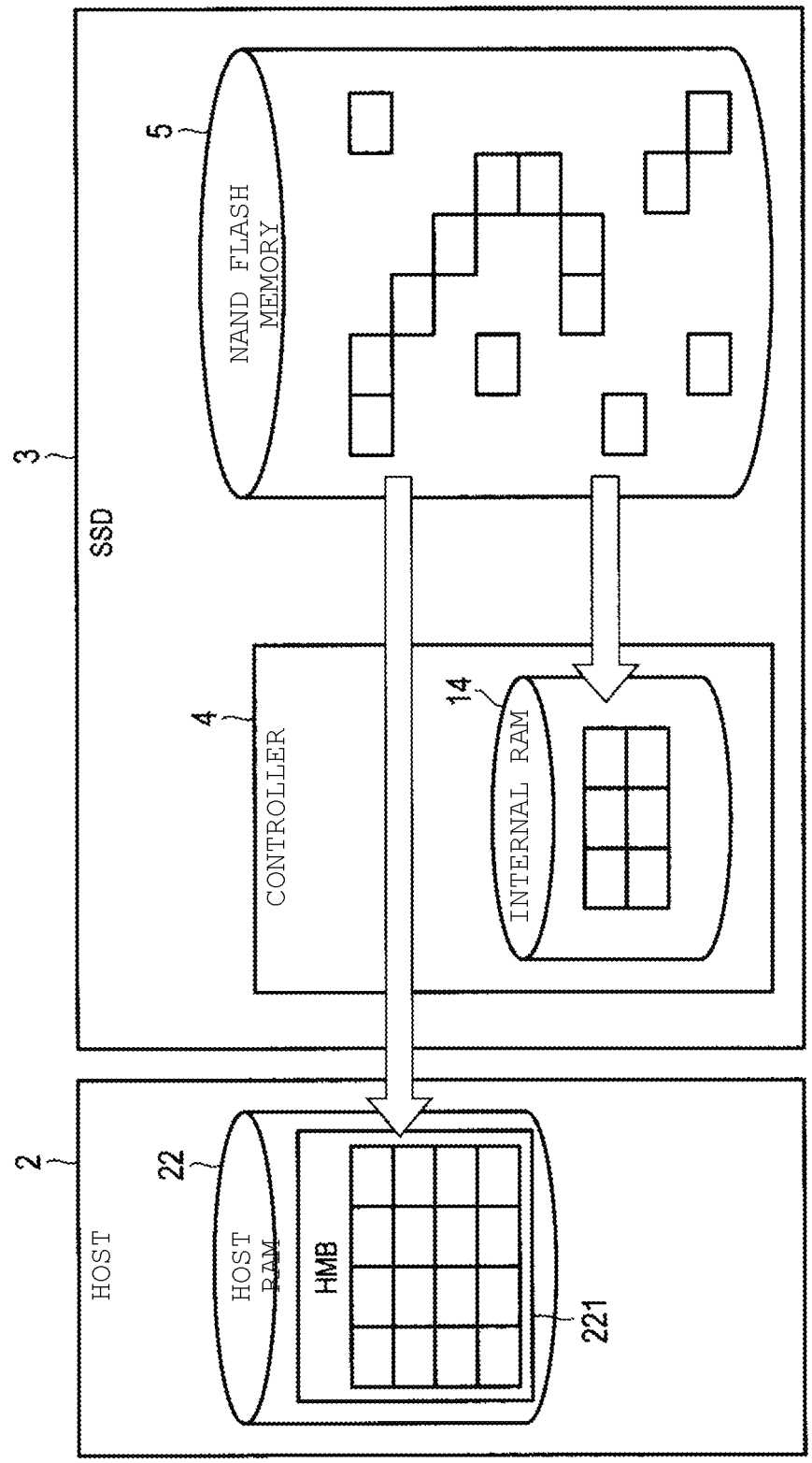
FIG. 2 is diagram showing an example in which a RAM (internal RAM) in the memory system and a host memory buffer (HMB) provided in a RAM (host RAM) in a host are used as a cache area by the memory system of the embodiment.

FIG. 2 shows an example in which the internal RAM 14 and the HMB 221 provided in the host RAM 22 are used as a cache area by the SSD 3 having the HMB function. In the example shown in FIG. 2, the SSD 3 caches the data read from the NAND flash memory 5 in the internal RAM 14 and the HMB 221 provided in the host RAM 22. Since not only the internal RAM 14 but also the HMB 221 in the host RAM 22 may be used as a cache area (that is, working RAM), the SSD 3 may speed up processing without increasing the capacity of the internal RAM 14.

Figure 3:
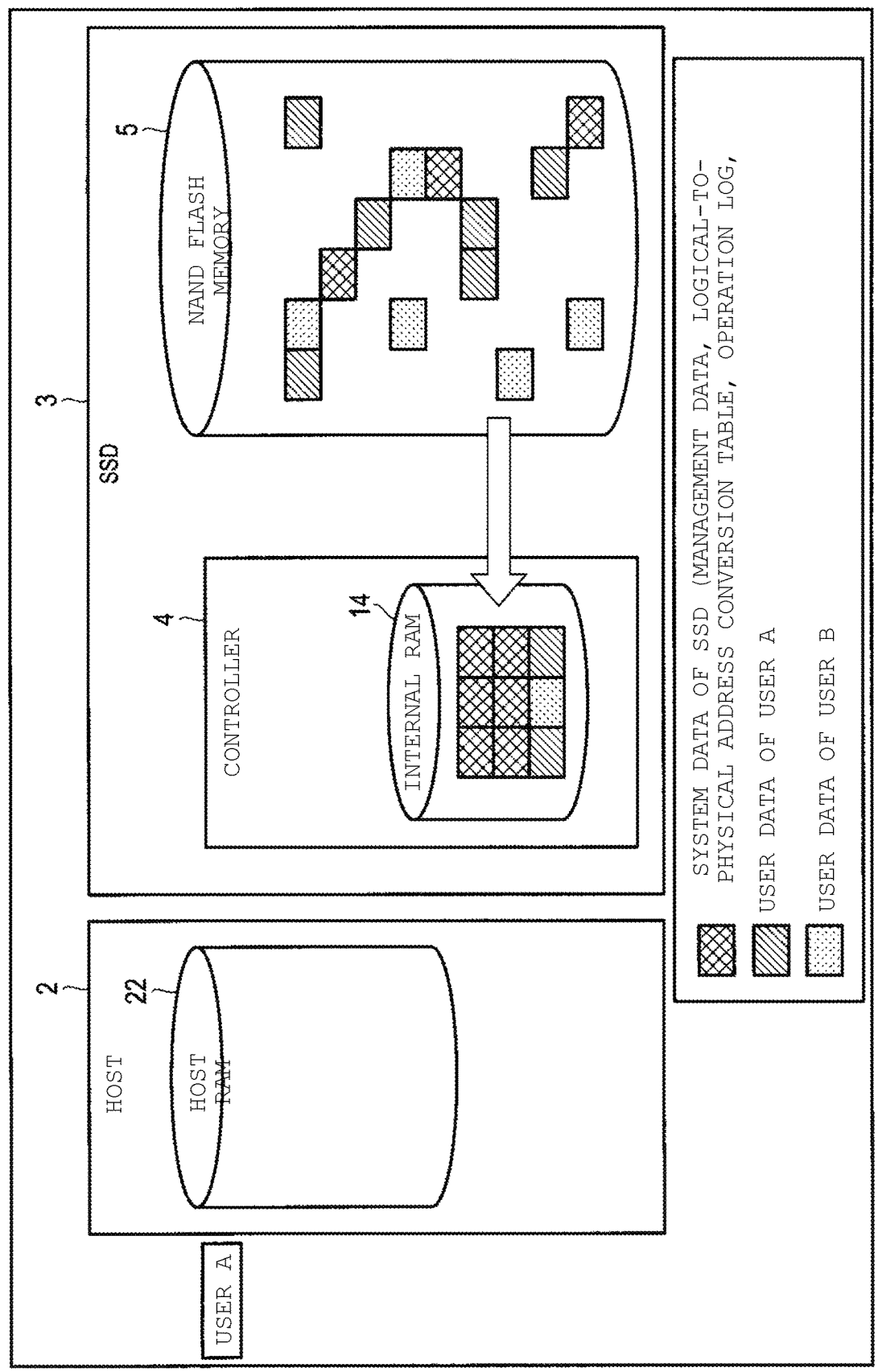
FIG. 3 is a diagram showing an example in which only the internal RAM is used as a cache area by the memory system of the embodiment.

FIG. 3 shows an example in which system data of the SSD 3 and user data of each of a plurality of users who use the host 2 are written to the NAND flash memory 5 in the SSD 3. The system data includes data such as management data, security keys used for encryption/decryption, FW, the logical-to-physical address conversion table, an operation log, and the like. The user data is, for example, user data of each of two users A and B who use the host 2.

When data read from the NAND flash memory 5 is cached only in the internal RAM 14 as in the example shown in FIG. 3, the host 2 may not directly access the internal RAM 14. Therefore, it is difficult for the host 2 to illegally access the data cached in the internal RAM 14, and the possibility of data leakage is low.

Figure 4:
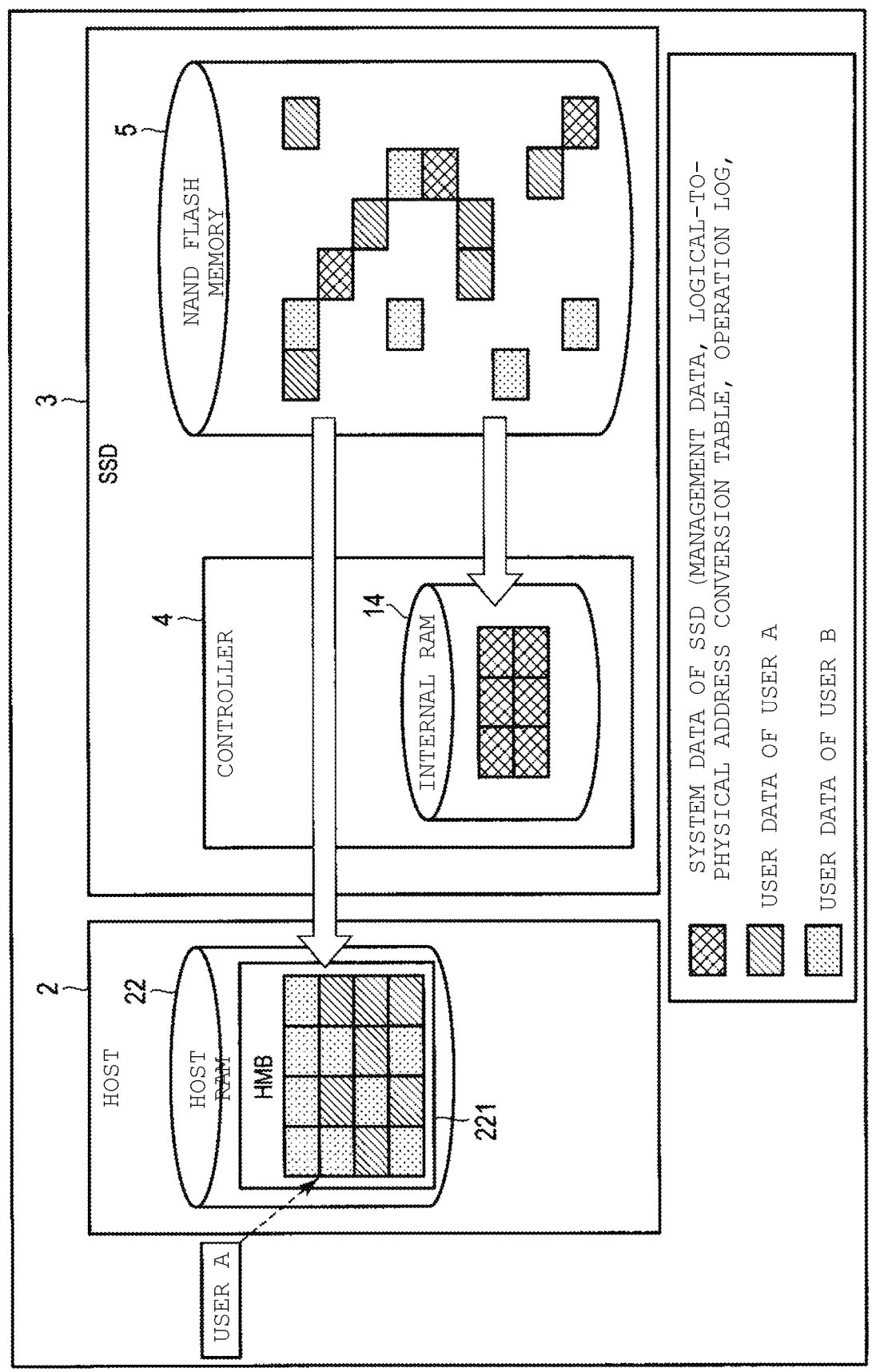
FIG. 4 is a diagram showing an example in which the HMB used by the memory system of the embodiment is improperly accessed.

On the other hand, FIG. 4 shows a case where data read from the NAND flash memory 5 is cached not only in the internal RAM 14 but also in the HMB 221 in the host RAM 22. In this case, since the HMB 221 is a RAM area outside the controller 4, the host 2 may access the HMB 221 more easily than accessing the internal RAM 14. Therefore, data cached in the HMB 221 is illegally accessed, and the possibility of leaking to the outside is higher than that in a case where the HMB 221 is not used.

For example, if valid data in a GC source block is cached in HMB 221, while a user is using the host 2, user data of another user may be cached in the HMB 221 as valid data in the GC source block. In other words, the use of the HMB 221 may be vulnerable to leakage of user data of the other user.

For example, by performing an operation for accessing data cached in the HMB 221, the user A may be able to acquire not only user data of the user A but also system data of the SSD 3 and user data of the user B. In this case, the user A may illegally access the system data of the SSD 3 and the user data of the user B without an access right. Similarly, there is a possibility that the user B may also illegally access the system data of the SSD 3 and the user data of the user A without an access right.

Figure 5:
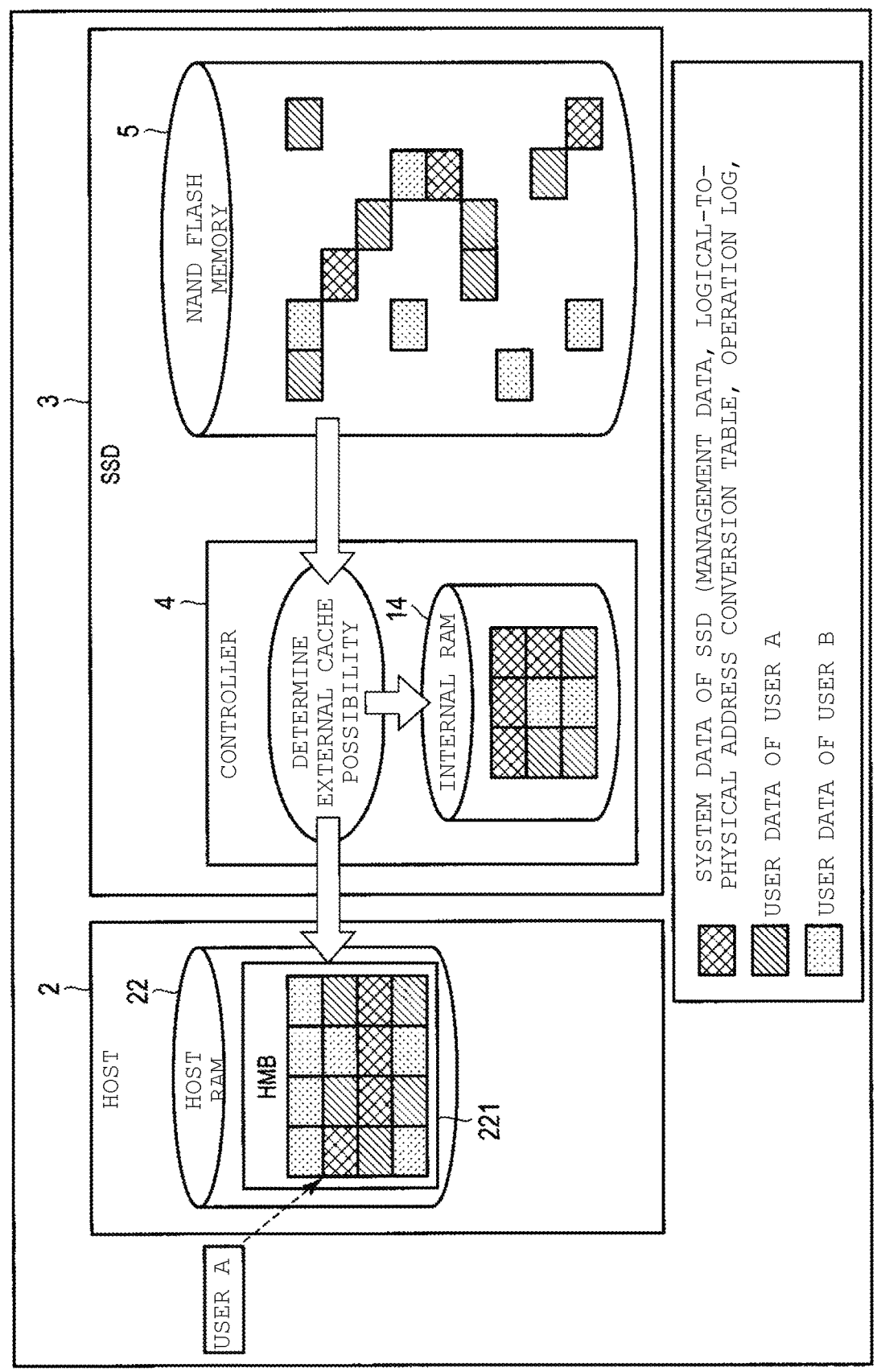
FIG. 5 is a diagram showing an example in which data to be cached in the internal RAM and data to be cached in an HMB are determined by the memory system of the embodiment.

FIG. 5 shows an example in which the controller 4 performs external cache possibility determination to determine whether data read from the NAND flash memory 5 may be externally cached.

In the present embodiment, as shown in FIG. 5, the controller 4 determines whether the data read from the NAND flash memory 5 is data to be cached outside the SSD 3 (for example, the HMB 221). Then, the controller 4 caches the data determined to be externally cached in the HMB 221 and caches the data determined to be not externally cached in the internal RAM 14. As a result, for example, the controller 4 caches data determined to have low priority from the viewpoint of security in the HMB 221 and caches data determined to have high priority in the internal RAM 14. Therefore, in the case of using the HMB 221, the controller 4 may switch the data cache destination according to the priority determined from the viewpoint of security.

FIG. 6 shows an example of conditions for determining whether the data read from the NAND flash memory 5 is data to be cached outside the SSD 3. The conditions are defined based on the content of data such as the type of data, the presence or absence of encryption, the security priority, and the like. In an example of the conditions shown in FIG. 6, the following is defined based on the type and content of the read data.

(1) Data whose type is user data and whose content is encrypted may be externally cached.

(2) Data whose type is user data and whose content is not encrypted may not be externally cached.

(3) Data whose type is system data and whose content is a security key may not be externally cached.

(4) Data whose type is system data and whose content is FW may not be externally cached.

(5) Data whose type is system data and whose content is a logical-to-physical address conversion table may be externally cached.

(6) Data whose type is system data and whose content is an operation log of the SSD 3 may be externally cached.

The above conditions define that these pieces of data are determined not to be externally cached based on a policy that unencrypted user data, data including a security key, and FW data that controls the operation by the CPU 12 out of the data read from the NAND flash memory 5 are data with high security priority. The above conditions further define that these pieces of data are determined to be externally cached based on a policy that the encrypted user data and the data in the internal log of the SSD 3 are data with low security priority.

For example, when data is read from the NAND flash memory 5, the cache destination determination unit 126 determines whether the data is externally cached according to the conditions as described above. As a result, since data with high security priority is not cached outside the SSD 3 (here, HMB 221), it is possible to prevent such data leakage and to speed up the processing using HMB 221.

The above conditions are one example, and various conditions may be set in accordance with the application of the information processing system 1, an instruction of an administrator and users, and the like. For example, data whose type is user data may not be externally cached regardless of whether the data is encrypted or not.

The data cached in the HMB 221 is more likely to be corrupted or falsified than the data cached in the internal RAM 14. When the data cached in the HMB 221 is corrupted or falsified, in the SSD 3 using the data, problems such as a malfunction, a loss of data, and a start failure may occur.

In order to cope with such data corruption or falsification, the SSD 3 uses, for example, a method of adding parity to data. By caching data and parity in the HMB 221, the SSD 3 may use the parity to determine whether an error has occurred in data.

However, if parity generated by a fixed calculation method is used, (1) when an SSD reads data cached in the HMB 221 by another SSD having the same configuration as the SSD, or (2) when an SSD reads data that is previously cached in the HMB 221 by the SSD and is already invalid, the data may not be determined as data in which an error has occurred. Data cached by another SSD or data that is already invalid may cause a defect in the SSD that has read the data, and thus is determined as data in which an error has occurred.

Figure 7:
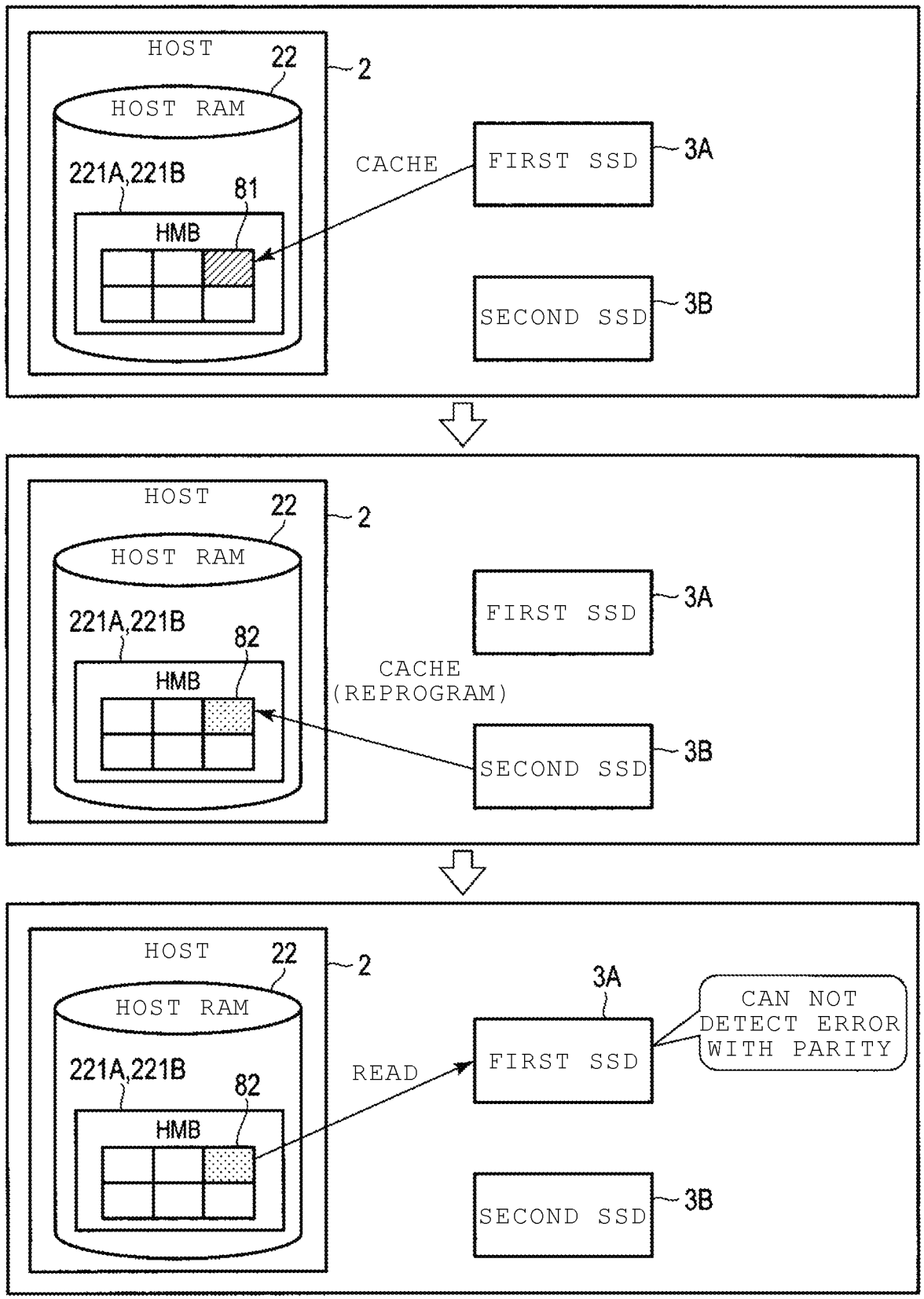
FIG. 7 is a diagram showing an example in which the HMB used by the memory system of the embodiment and the HMB used by another memory system are provided in an overlapping area in the host RAM.

Referring to FIG. 7, a specific case in which data with an error has occurred may not be determined with the parity generated by the fixed calculation method will be illustrated. FIG. 7 shows a case where the information processing system 1 constructs a RAID using a first SSD 3A and a second SSD 3B.

In this case, when a RAID is constructed using the first SSD 3A and the second SSD 3B having the same configuration, an HMB 221A used by the first SSD 3A and an HMB 221B used by the second SSD 3B are provided in an overlapping area in the host RAM 22 due to a defect in the RAID controller (not shown).

Since the HMBs 221A and 221B are originally areas used exclusively by the SSDs 3A and 3B, the HMB 221A used by the first SSD 3A and the HMB 221B used by the second SSD 3B have to be allocated as independent areas. As shown in FIG. 7, when the HMB 221A used by the first SSD 3A and the HMB 221B used by the second SSD 3B are erroneously placed in an overlapping manner, for example, there is a possibility that the second SSD 3B reprograms data 81 cached by the first SSD 3A in the HMB 221A with another data 82. Therefore, data cached by the first SSD 3A may be corrupted.

Then, when the first SSD 3A reads the data 82 reprogrammed by the second SSD 3B, even if the read data 82 is different from the data 81 cached by the first SSD 3A, in the verification of the data 82 using the parity added to the data 82, the first SSD 3A may not determine the data 82 as data in which an error has occurred. This is because the two SSDs 3A and 3B generate the parity by the same calculation method, and the correct parity is added to the data 82.

Figure 8:
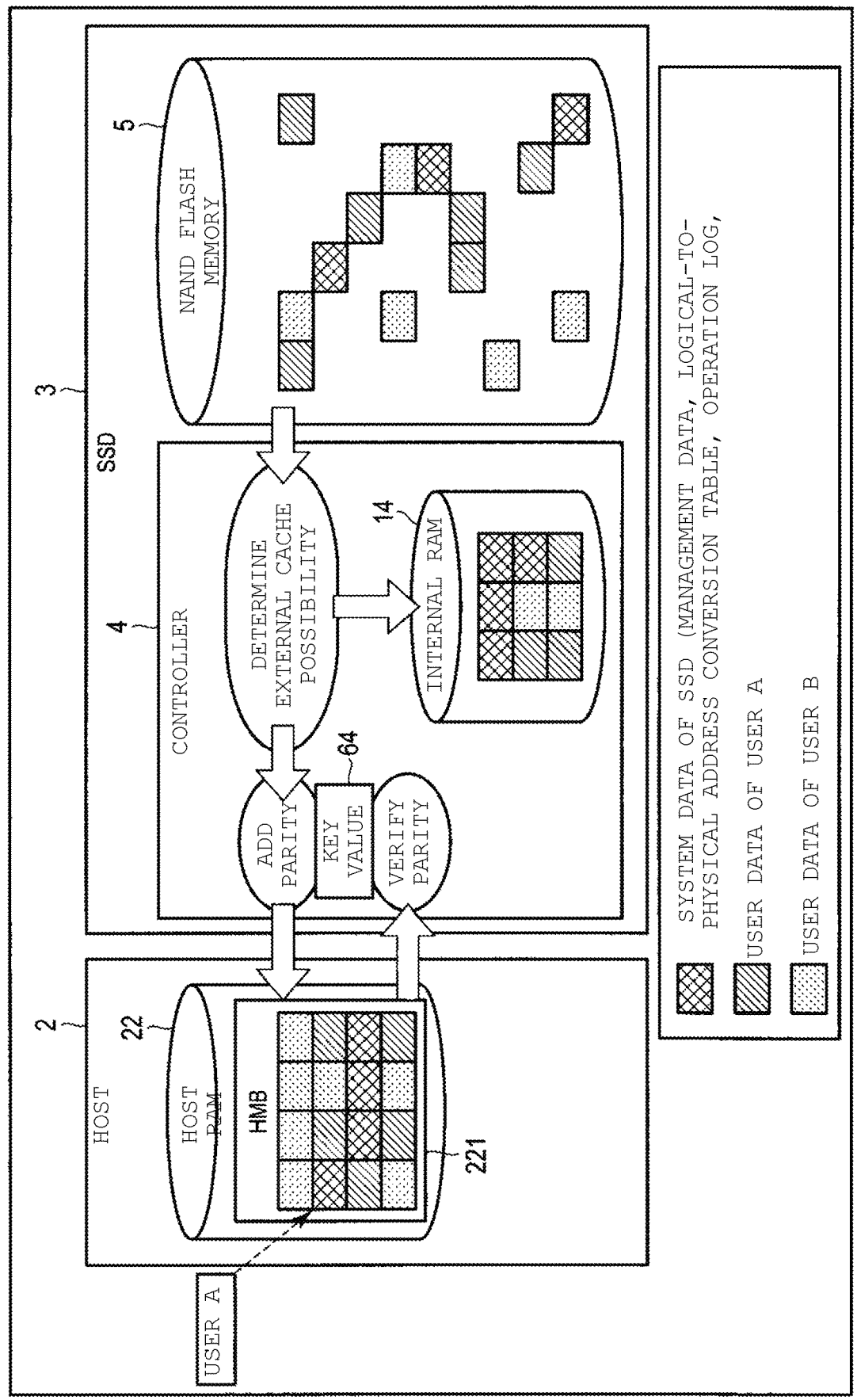
FIG. 8 is a diagram showing an example in which parity is added to data cached in the HMB using a key value by the memory system of the embodiment.

FIG. 8 shows an example in which the controller 4 in the SSD 3 performs parity addition and verification using a key value 64 in the present embodiment. The controller 4 uses the parity generator 112 to add parity to the data to be cached in the HMB 221 using the key value 64. Then, the controller 4 caches the data to which the parity is added in the HMB 221. The key value 64 is, for example, a unique value including a random number. The controller 4 updates the key value 64 each time the HMB function of the SSD 3 is enabled.

The data to which parity is to be added is not limited to read data that is read from the NAND flash memory 5 and determined to be cached in the HMB 221, and any data may be used as long as the data is to be cached in the HMB 221 via the host interface 11. For example, the controller 4 may add parity to user data (that is, user data to be written to the NAND flash memory 5) received using the key value 64 in response to the acceptance of a write command from the host 2 and caches the user data to which parity is added in the HMB 221.

In the case of reading data cached in HMB 221, the controller 4 verifies whether or not an error has occurred in the read data using the key value 64 and the parity added to the read data in the parity checker 113. As a result of the verification, if no error has occurred in the read data, the controller 4 continues the processing using the data. On the other hand, if an error has occurred in the read data, the controller 4 discards the data.

Figure 9:
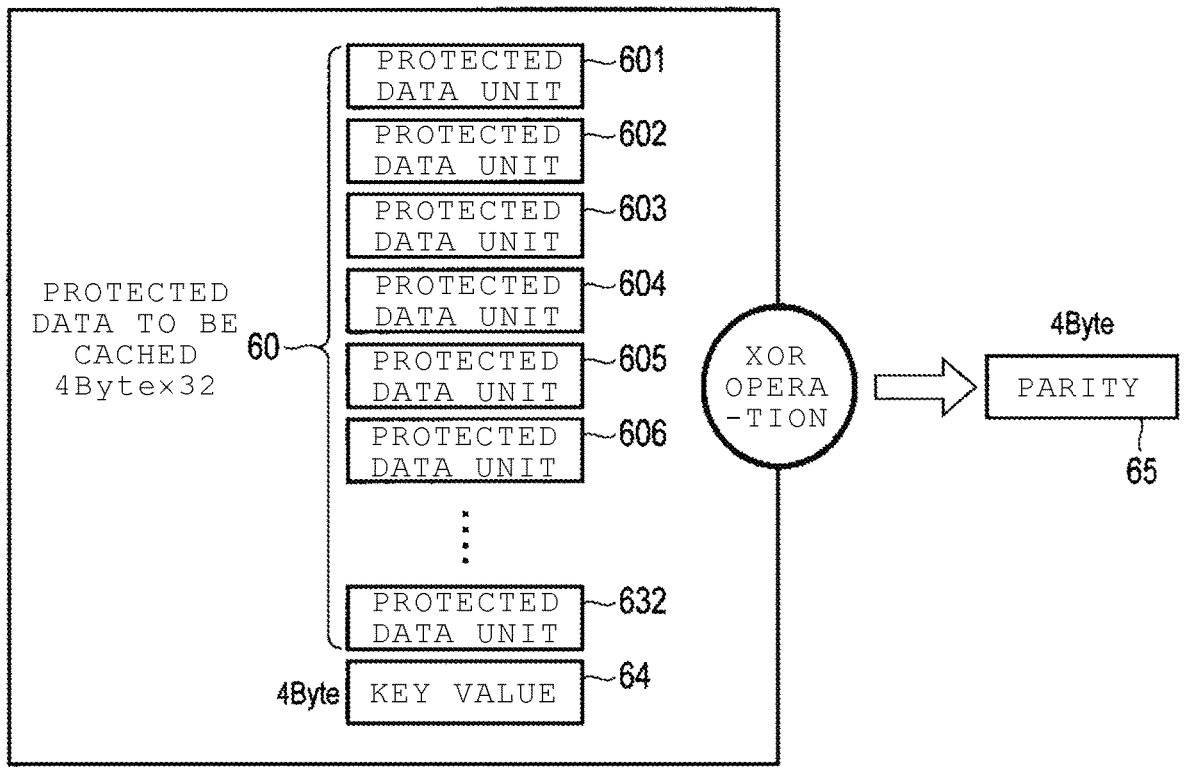
FIG. 9 is a diagram showing an example of the parity generated by the memory system of the embodiment.

FIG. 9 shows an example of a method of generating parity to be added to data. The data is data to be cached in the HMB 221 and data to be protected with parity. Hereinafter, this data is also referred to as protected data.

FIG. 9 exemplifies a case where a 4-byte parity 65 is generated for 128-byte protected data 60 using the 4-byte key value 64. The data size of the key value 64, the protected data 60, and the parity 65 is an example and may be appropriately changed according to the configuration, application, and the like of the SSD 3.

The parity generator 112 generates a parity 65 using 32 protected data units 601 to 632 obtained by dividing the protected data 60 in units of 4 bytes and the key value 64. The key value 64 is generated by, for example, the CPU 12 (more specifically, the key generation unit 125) and is stored in the parity generator 112 and the parity checker 113. The parity generator 112 generates an exclusive OR (XOR) operation result of the 32 protected data units 601 to 632 and the key value 64 as a parity 65.

Figure 10:
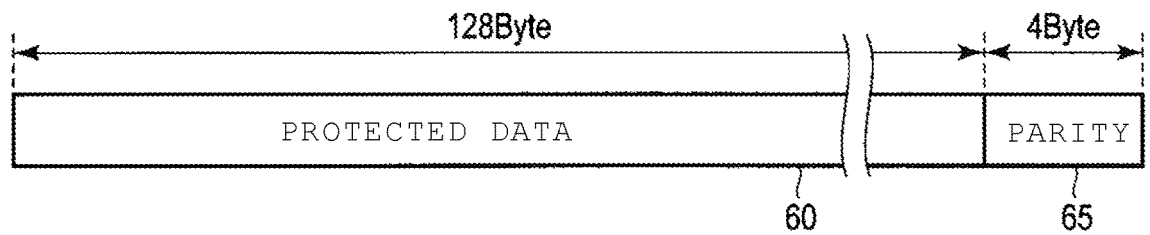
FIG. 10 is a diagram showing an example of data to be cached in the HMB by the memory system of the embodiment.

FIG. 10 shows an example of the protected data 60 and the parity 65 cached in the HMB 221. The controller 4 caches the protected data 60 and the generated parity 65 in the HMB 221 via the storage interface 23.

Figure 11:
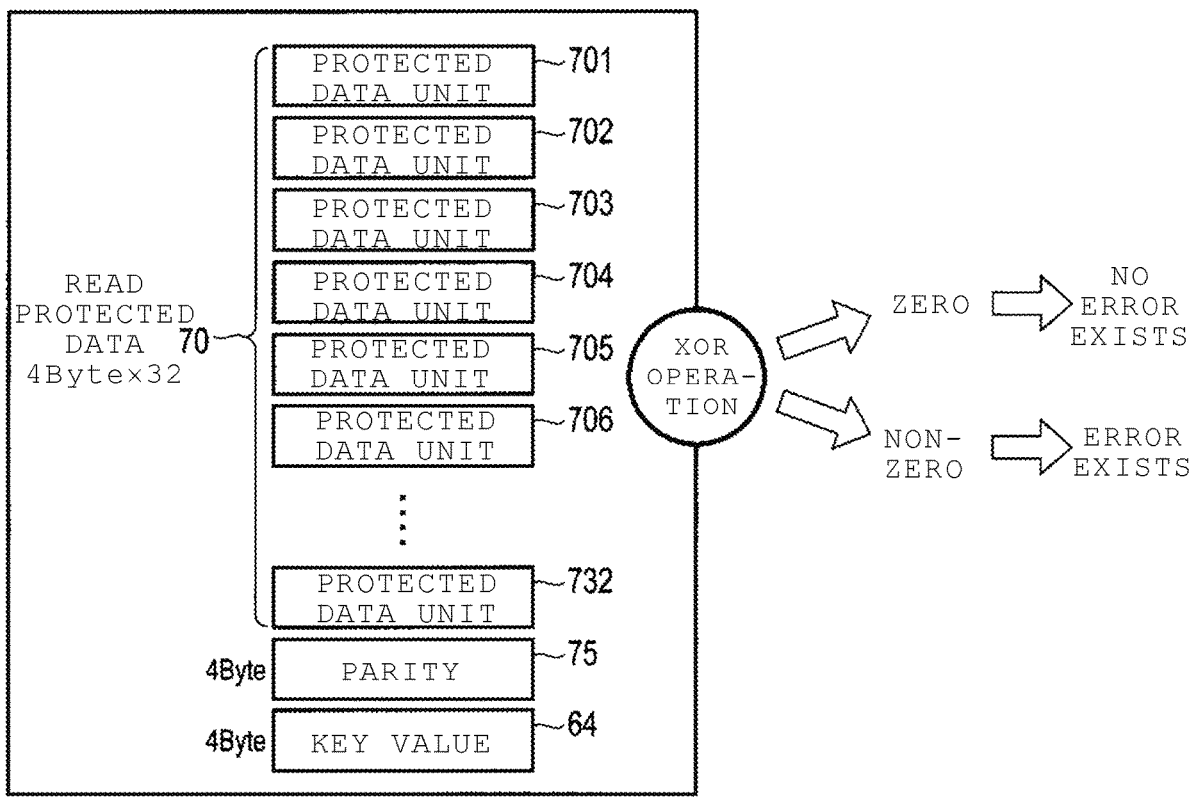
FIG. 11 is a diagram showing an example in which data read from the HMB is verified using the parity and the key value by the memory system of the embodiment.

FIG. 11 shows an example of verifying whether or not an error has occurred in protected data 70 when the 128-byte protected data 70 and a 4-byte parity 75 are read from the HMB 221. The parity checker 113 verifies whether or not an error has occurred in the protected data 70 using 32 protected data units 701 to 732 obtained by dividing the read protected data 70 in units of 4 bytes, the read parity 75, and the key value 64.

The parity checker 113 sets the result of the XOR operation of the 32 protected data units 701 to 732, the parity 75, and the key value 64 as a verification value. If the verification value is 0, the parity checker 113 determines that an error has not occurred in the protected data. On the other hand, if the verification value is not 0, the parity checker 113 determines that an error has occurred in the protected data.

As described above, the SSD 3 according to this embodiment may use the key value 64 and the parity 75 to verify whether or not the protected data 70 read from the HMB 221 has an error such as corruption or falsification. When an error has occurred in the read protected data 70, for example, if the protected data 70 is data read from the NAND flash memory 5 and cached in the HMB 221, the SSD 3 reads the corresponding original data from the NAND flash memory 5 again. As a result, it is possible to avoid a malfunction or the like of the SSD 3 due to the processing using the protected data 70 in which an error has occurred.

The method of adding parity to protected data and verifying the protected data using the parity is not limited to the method using the XOR operation described above, and the SSD 3 may use any method as long as the method uses the parity that reflects the value (for example, the key value 64) updated each time the HMB function is enabled.

As described above, the CPU 12 updates the key value 64, for example, each time the HMB function is enabled, and notifies the parity generator 112 and the parity checker 113 of the key value 64.

More specifically, when the HMB function is enabled by specifying a first HMB (that is, an address range in the host RAM 22 indicating the first HMB) in the host RAM 22, the CPU 12 generates a first key value. Then, in a first enabling period from the time when the HMB function is enabled to the time when the HBM function is disabled, the parity generator 112 adds the first parity to the first data to be cached in the first HMB using the first key value. When the first data and the first parity are read from the first HMB in the first enabling period, the parity checker 113 verifies the read first data using the first key value and the read first parity.

After the end of the first enabling period, when the HMB function is enabled by specifying a second HMB in the host RAM 22, the CPU 12 generates a second key value different from the first key value. That is, the CPU 12 updates the key value used by the SSD 3 from the first key value to the second key value. Then, after the first enabling period ends, in a second enabling period from the time when the HMB function is enabled to the time when the HBM function is disabled, the parity generator 112 adds a second parity to second data to be cached in the second HMB using the second key value. When the second data and the second parity are read from the second HMB in the second enabling period, the parity checker 113 verifies the read second data using the second key value and the read second parity.

The area in the host RAM22 used as the second HMB may be the same area as the first HMB, or may be a different area. Even if the area in the host RAM 22 used as the second HMB is the same area as the first HMB, the SSD 3 does not continuously use the data cached in the area.

Similarly, after the second enabling period ends, when the HMB function is enabled by specifying a third HMB in the host RAM 22, the CPU 12 generates a third key value different from the first key value and the second key value. That is, the CPU 12 updates the key value used by the SSD 3 from the second key value to the third key value. Then, after the second enabling period ends, in a third enabling period from the time when the HMB function is enabled to the time when the HBM function is disabled, the parity generator 112 adds a third parity to third data to be cached in the third HMB using the third key value. When the third data and the third parity are read from the third HMB in the third enabling period, the parity checker 113 verifies the read third data using the third key value and the read third parity.

The area in the host RAM 22 used as the third HMB may be the same area as the second HMB, or may be a different area. Even if the area in the host RAM 22 used as the third HMB is the same area as the second HMB, the SSD 3 does not continuously use the data cached in the area.

Thus, the SSD 3 uses a unique value as the key value for each enabling period from the time when the HMB function is enabled to the time when the HBM function is disabled. Thereby, when data that is cached by another SSD having a similar configuration for adding parity, or data that is cached by this SSD 3 in the past and is already invalid (that is, data cached in the enabling period prior to a current enabling period) are read from the HMB 221, the SSD 3 may determine the data as data in which an error has occurred. This is because parity is added to the read data by using a key value different from a current key value. Therefore, the SSD 3 having the above configuration may enhance the security when the HMB 221 is used.

It is possible to prevent the defect of the SSD 3 due to reading of erroneous data such as old invalid data by enabling the HMB function, that is by updating the key value at timing such as switching of the user using the host 2, power on, shifting from the power saving mode to the normal mode, and the like. Furthermore, even if a plurality of areas respectively allocated as an HMB to a plurality of SSDs overlap in the host RAM 22, because each SSD uses a different key value, it is also possible to prevent erroneous data such as data cached by another SSD from being read by randomly generating key values.

The SSD 3 may have a memory return (MR) function. The MR function is, for example, one of the HMB functions defined in the NVMe standard, and is a function for continuing to use the HMB 221 when the HMB function is disabled when the HMB function is enabled after the HMB function is disabled. That is, the MR function allows the SSD 3 to continue to use the data cached in the HMB 221 when the HMB function is disabled. For example, when the SSD 3 that was in the power-on state is powered off to save power and the like while the host 2 is in the power-on state, the SSD 3 that has been powered on again may continue to use the HMB 221 that was being used before the SSD 3 was powered off, using the MR function. When the SSD 3 has an MR function, the MR function may be further specified to be enabled or disabled when the HMB function is enabled.

Enabling of the MR function indicates that the content of the HMB 221 is continuously used at the end of the latest enabling period of the enabling periods (that is, the period from the time when the HMB function is enabled to the time when the HBM function is disabled). When the MR function is specified to be enabled, the CPU 12 uses the key value 64 used for the latest enabling period as it is without updating the key value 64 so that the data cached in the HMB 221 at the end of the latest enabling period may be used continuously. In this case, the HMB 221 used in the latest enabling period and the HMB 221 used in the subsequent new enabling period are, for example, the same area in the host RAM 22 (that is, an area of the same address range in the host RAM 22).

On the other hand, disabling of the MR function indicates that the HMB 221 is not used at the end of the latest enabling period. When the MR function is specified to be disabled, the CPU 12 updates the key value 64. Thereby, for example, even if data cached in the HMB 221 in the latest enabling period is read erroneously, the parity checker 113 may determine the data as data in which an error has occurred. Also, in this case, the HMB 221 used in the latest enabling period and the HMB 221 used in the subsequent new enabling period may be, for example, the same area in the host RAM 22 or may be different areas.

More specifically, when the HMB function is enabled by specifying the first HMB in the host RAM 22 and disabling of the MR function, the CPU 12 generates the first key value and stores the first key value in the parity generator 112 and the parity checker 113. Then, in the first enabling period from the time when the HMB function is enabled to the time when the HBM function is disabled, the parity generator 112 adds the first parity to the first data to be cached in the first HMB using the first key value. When the first data and the first parity are read from the first HMB in the first enabling period, the parity checker 113 verifies the read first data using the first key value and the read first parity.

When the HMB function is enabled by specifying the first HMB in the host RAM 22 and enabling of the MR function after the first enabling period ends, the CPU 12 does not update the first key value, and each unit in the controller 4 continues to use the first HMB at the end of the first enabling period. Then, after the first enabling period ends, in the second enabling period from the time when the HMB function is enabled to the time when the HBM function is disabled, the parity generator 112 adds the second parity to the second data to be newly cached in the first HMB using the first key value. When the second data and the second parity are read from the first HMB in the second enabling period, the parity checker 113 verifies the read second data using the first key value and the read second parity. Furthermore, when the first data and the first parity are read from the first HMB in the second enabling period (that is, when the first data and the first parity cached in the first HMB are read in the first enabling period), the parity checker 113 verifies the read first data using the first key value and the read first parity. Since the first key value is used, the first data cached in the first HMB within the first enabling period is continuously used without being determined as data in which an error has occurred.

Then, after the second enabling period ends, when the HMB function is enabled by specifying the second HMB in the host RAM 22 and disabling of the MR function, the CPU 12 generates the second key value different from the first key value. That is, the CPU 12 updates the key value used by the SSD 3 from the first key value to the second key value. Then, after the second enabling period ends, in the third enabling period from the time when the HMB function is enabled to the time when the HBM function is disabled, the parity generator 112 adds the third parity to the third data to be cached in the second HMB using the second key value. When the third data and the third parity are read from the second HMB in the third enabling period, the parity checker 113 verifies the read third data using the second key value and the read third parity.

The area in the host RAM22 used as the second HMB may be the same area as the first HMB, or may be a different area. Even if the area in the host RAM 22 used as the second HMB is the same area as the first HMB, the SSD 3 does not continuously use the data cached in the area.

As described above, when the HMB function is enabled by specifying the MR function to be enabled, the SSD 3 continues to use the HMB 221 at the end of the latest enabling period without updating the key value 64. When the MR function is enabled, an operation for re-caching the data cached in the HMB 221 at the end of the latest enabling period in the new HMB 221 is unnecessary.

An example of a processing sequence for enabling the HMB function will be described with reference to FIGS. 12 and 13. The Set Features command to be used when the host 2 requests the SSD 3 to enable the HMB function includes a value (Enable Host Memory (EHM)=1) indicating that the HMB function is enabled and a value (MR=0) indicating that the MR function is disabled or a value (MR=1) indicating that the MR function is enabled. The host 2 may also provide the SSD 3 with address information of a list indicating one or more areas used as the HMB 221 in the host RAM 22 together with the Set Features command.

Figure 12:
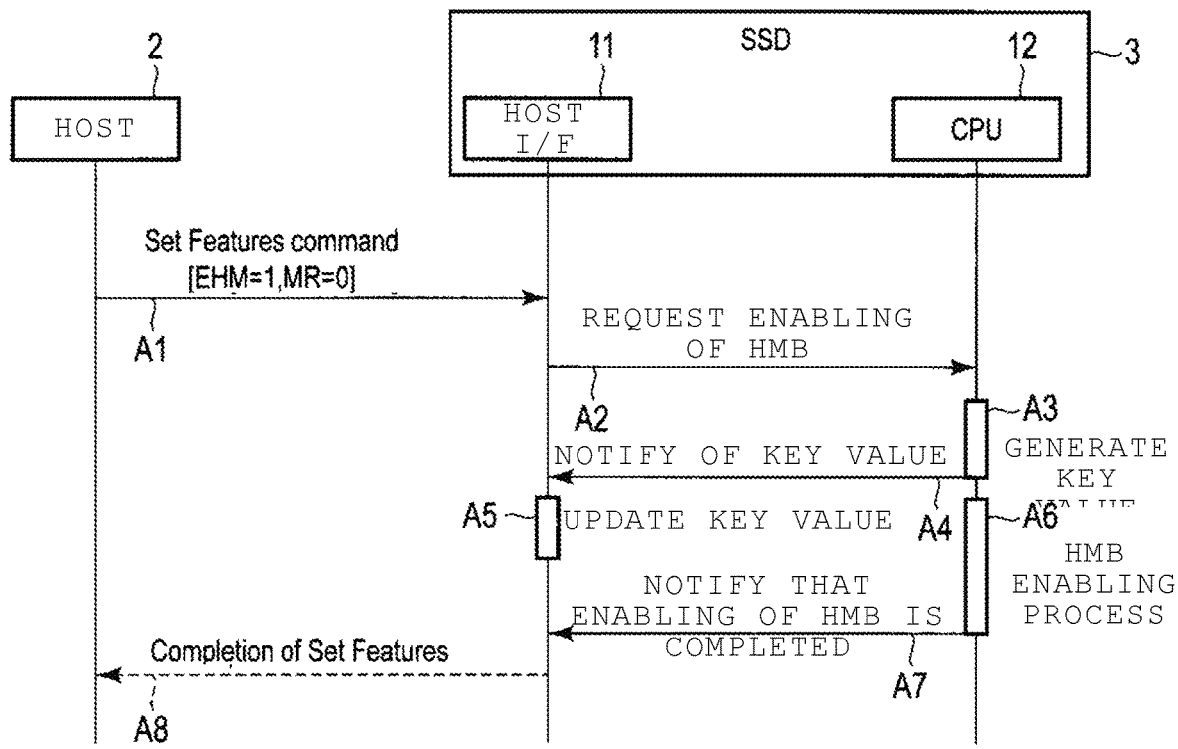
FIG. 12 is a diagram showing a sequence of HMB enabling process executed by the memory system of the embodiment when a memory return (MR) function is specified to be disabled.

First, FIG. 12 shows an example when the Set Features command includes a value indicating that the MR function is disabled.

The host 2 transmits a Set Features command including the value indicating that the HMB function is enabled and the value indicating the MR function is disabled, to the SSD 3 (A1).

The host interface 11 of the SSD 3 sends a request to enable the HMB function to the CPU 12 in response to the Set Features command (A2). The request indicates that the MR function is disabled.

The CPU 12 generates a key value in response to the request indicating that the MR function is disabled (A3) and notifies the host interface 11 of the generated key value (A4). In the host interface 11, the parity generator 112 and the parity checker 113 store the notified key value (A5). When a key value is already stored in the parity generator 112 and the parity checker 113, the parity generator 112 and the parity checker 113 update the key value with the notified key value.

Next, the CPU 12 enables the HMB function (A6). Then, the CPU 12 notifies the host interface 11 that enabling of the HMB function is completed (A7). The host interface 11 may notify the host 2 of the completion of the processing based on the Set Features command in response to the notification (A8).

As described above, the SSD 3 generates a key value and enables the HMB function in response to the Set Features command specifying that the HMB function is enabled and the MR function is disabled. When the SSD 3 does not have the MR function, the SSD 3 may perform the above-described processing sequence for generating a key value and enabling the HMB function in response to the Set Features command that does not include parameters related to the MR function.

Figure 13:
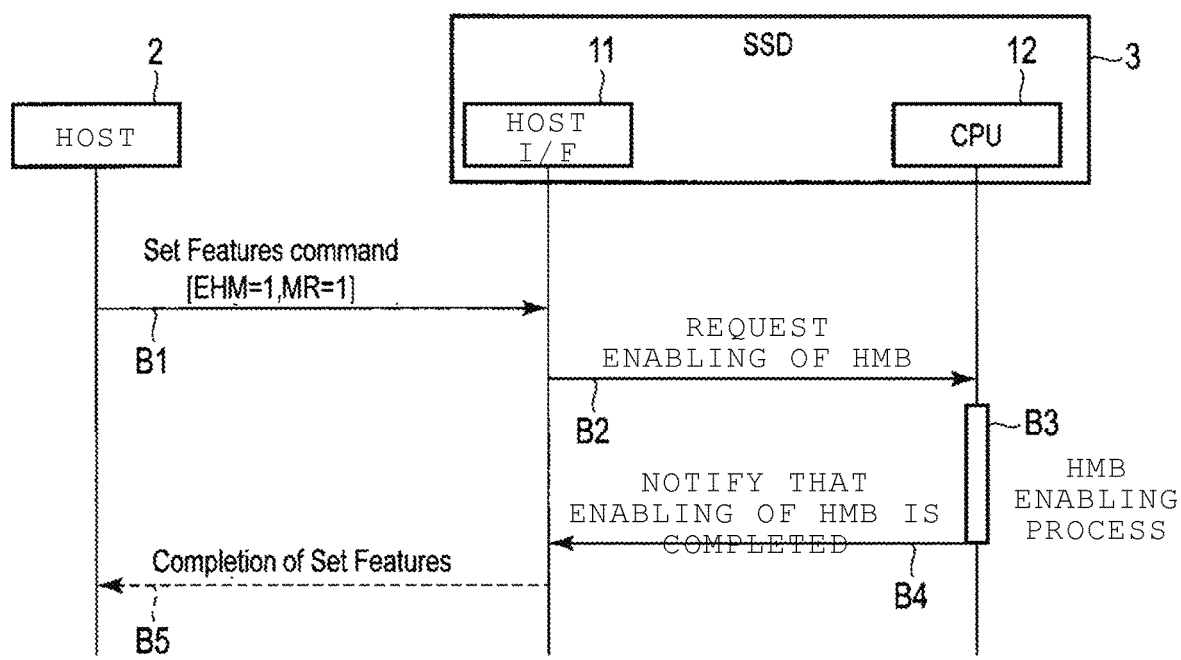
FIG. 13 is a diagram showing a sequence of HMB enabling process executed by the memory system of the embodiment when the MR function is specified to be enabled.

On the other hand, FIG. 13 shows an example when the Set Features command includes a value indicating that the MR function is enabled.

The host 2 transmits a Set Features command including the value indicating that the HMB function is enabled and the value indicating the MR function is enabled, to the SSD 3 (B1).

The host interface 11 of the SSD 3 sends a request to enable the HMB function to the CPU 12 according to the Set Features command (B2). The request indicates that the MR function is enabled.

The CPU 12 enables the HMB function in response to the request indicating that the MR function is enabled (B3). In the case of receiving the request indicating that the MR function is enabled, the CPU 12 does not generate key values, and therefore the parity generator 112 and parity checker 113 in the host interface 11 do not update the stored key values. The CPU 12 notifies the host interface 11 that enabling of the HMB function is completed (B4).

The host interface 11 may notify the host 2 of the completion of the processing based on the Set Features command in response to the notification (B5).

As described above, the SSD 3 enables the HMB function without generating a key value according to the Set Features command specifying that the HMB function is enabled and the MR function is enabled.

Figure 14:
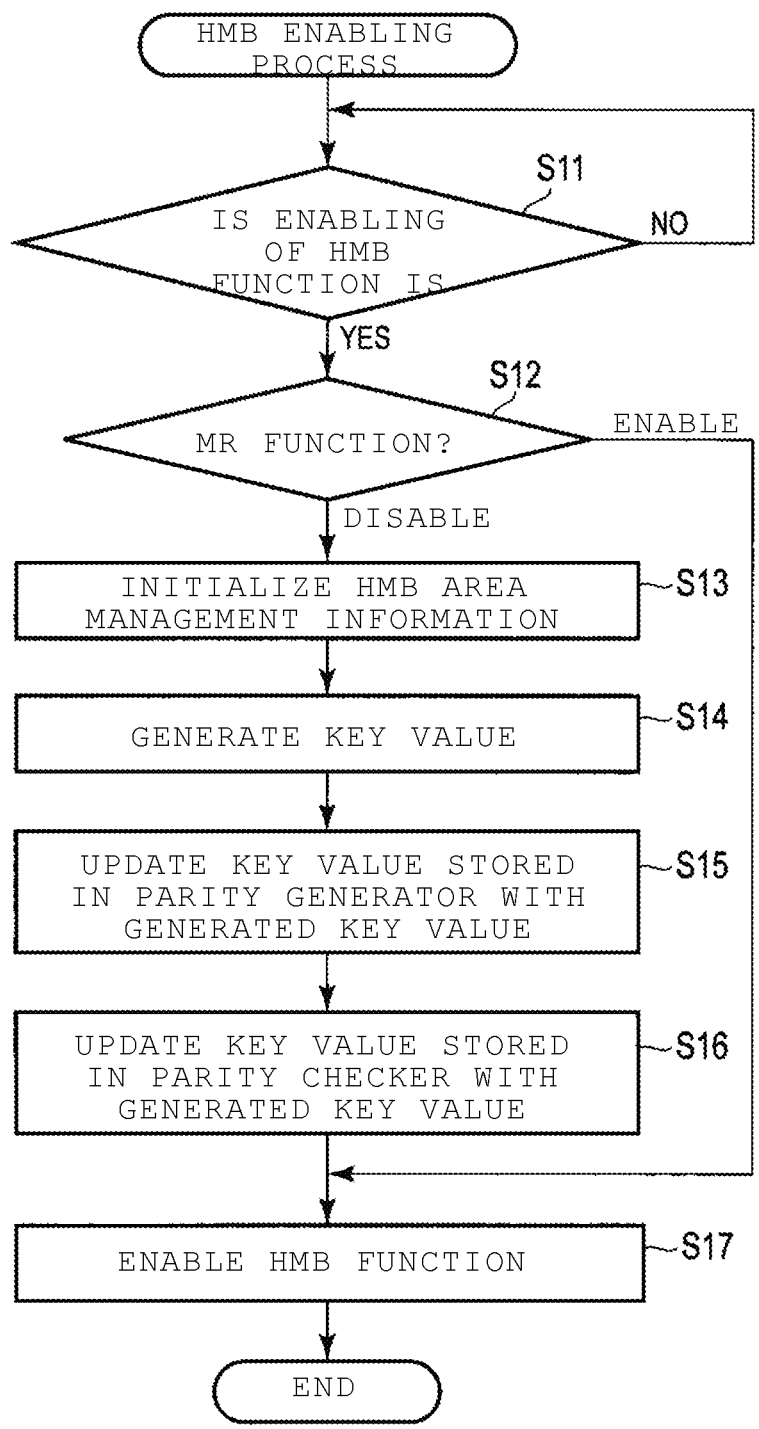
FIG. 14 is a flowchart showing an example of a procedure of HMB enabling process executed by the memory system of the embodiment.

An example of the procedure of the HMB enabling process executed by the controller 4 will be described with reference to the flowchart of FIG. 14. Here, it is assumed that the HMB function of the SSD 3 was disabled before the HMB enabling process is started.

First, the controller 4 determines whether or not the host 2 has requested to enable the HMB function (step S11). When the HMB function is not requested to be enabled (NO in step S11), returning to step S11, and it is determined again whether or not the HMB function is requested to be enabled.

When the HMB function is requested to be enabled (YES in step S11), the controller 4 determines whether the MR function is specified to be enabled or disabled in the request (step S12). When the MR function is specified to be enabled (enabling in step S12), the controller 4 enables the HMB function (step S16) and ends the processing.

On the other hand, when the MR function is specified to be disabled (disabling of step S12), the controller 4 initializes HMB area management information for managing the HMB 221 (step S13) and generates a key value (step S14). The key value is used to add parity to the data to be cached in the HMB 221. Then, the controller 4 updates the key value stored in the parity generator 112 with the generated key value (step S15) and updates the key value stored in the parity checker 113 with the generated key value (step S16). Then, the controller 4 enables the HMB function (step S17) and ends the processing.

By the above processing, the controller 4 may enable the HMB function in response to a request from the host 2. At this time, when the MR function is specified to be disabled, the controller 4 initializes HMB area management information and generates a new key value each time the HMB function is enabled. Therefore, the controller 4 may add parity to the data to be cached in the initialized HMB 221 by using the new key value.

When the MR function is specified to be enabled, the controller 4 may enable the HMB function without initializing the HMB area management information and without generating a new key value. Since the key values stored in the parity generator 112 and the parity checker 113 are not updated, the controller 4 may continue to use the data in the HMB 221 which has been used before the HMB enabling process is started.

When the MR function is not specified to be enabled or disabled, step S12 is omitted, the controller 4 sequentially executes step S13, step S14, step S15, step S16, and step S17 and ends the processing.

Figure 15:
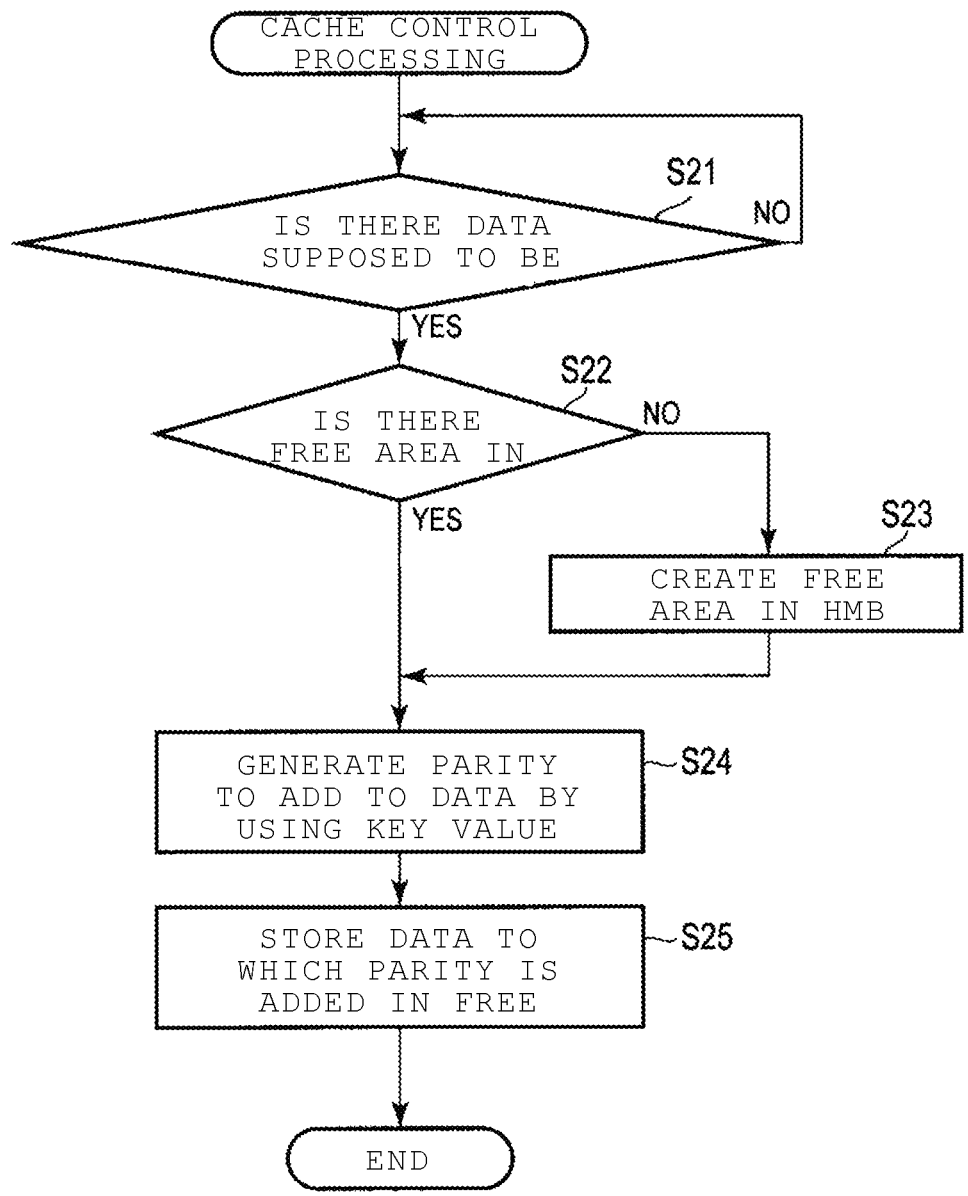
FIG. 15 is a flowchart showing an example of a procedure of cache control processing executed by the memory system of the embodiment.

An example of the procedure of the cache control processing executed by the controller 4 will be described with reference to the flowchart of FIG. 15. Here, it is assumed that the HMB function has already been enabled by the HMB enabling process described above with reference to FIG. 14.

First, the controller 4 determines whether or not there is data to be cached in the HMB 221 (step S21). The data to be cached is protected data to be protected with parity. When there is no data to be cached in the HMB 221 (NO in step S21), the controller 4 returns to step S21 and determines again whether or not there is data to be cached in the HMB 221. That is, by returning to step S21, the controller 4 determines whether or not data to be cached is newly generated after there is no data to be cached.

When there is data to be cached in the HMB 221 (YES in step S21), the controller 4 determines whether or not there is a free area in the HMB 221 for caching data (step S22). The controller 4 uses, for example, HMB area management information to determine the presence or absence of the free area. When there is no free area (NO in step S22), the controller 4 creates a free area in the HMB 221 according to a specific rule (step S23). This specific rule is, for example, the least recently used (LRU) method. When the controller 4 follows the LRU method, the controller 4 selects the data that has the longest elapsed time after the last access as a target to be evicted. When there is a free area (YES in step S22), the controller 4 skips step S23.

Next, the controller 4 uses the key value 64 to generate parity to be added to the data to be cached (step S24). Then, the controller 4 caches the data to which the parity is added in the free area in the HMB 221 (step S25), updates the HMB area management information, and ends the processing.

As described above, the controller 4 may cache the data to which the parity is added in the HMB 221.

Figure 16:
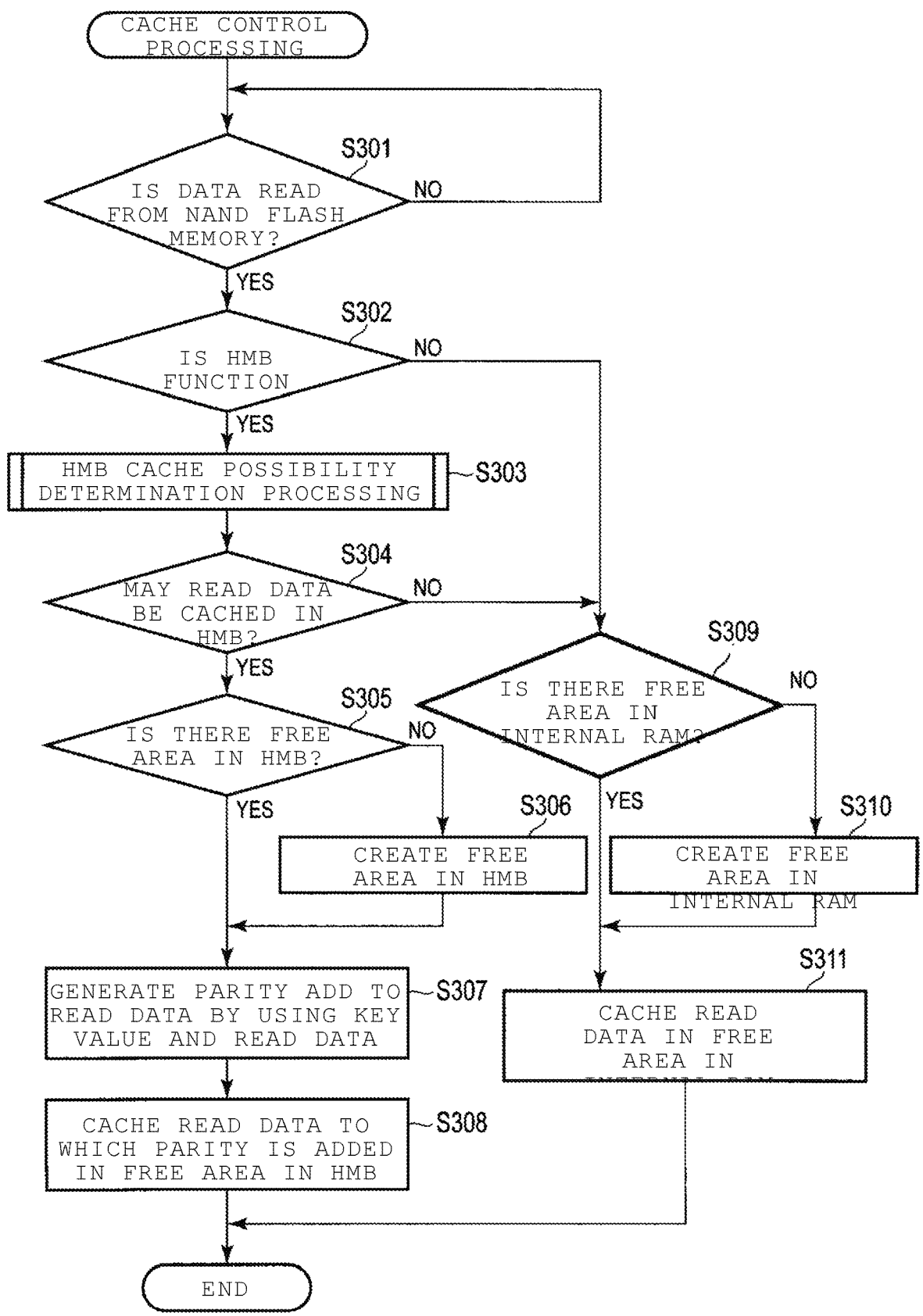
FIG. 16 is a flowchart showing another example of the procedure of cache control processing executed by the memory system of the embodiment.
Figure 17:
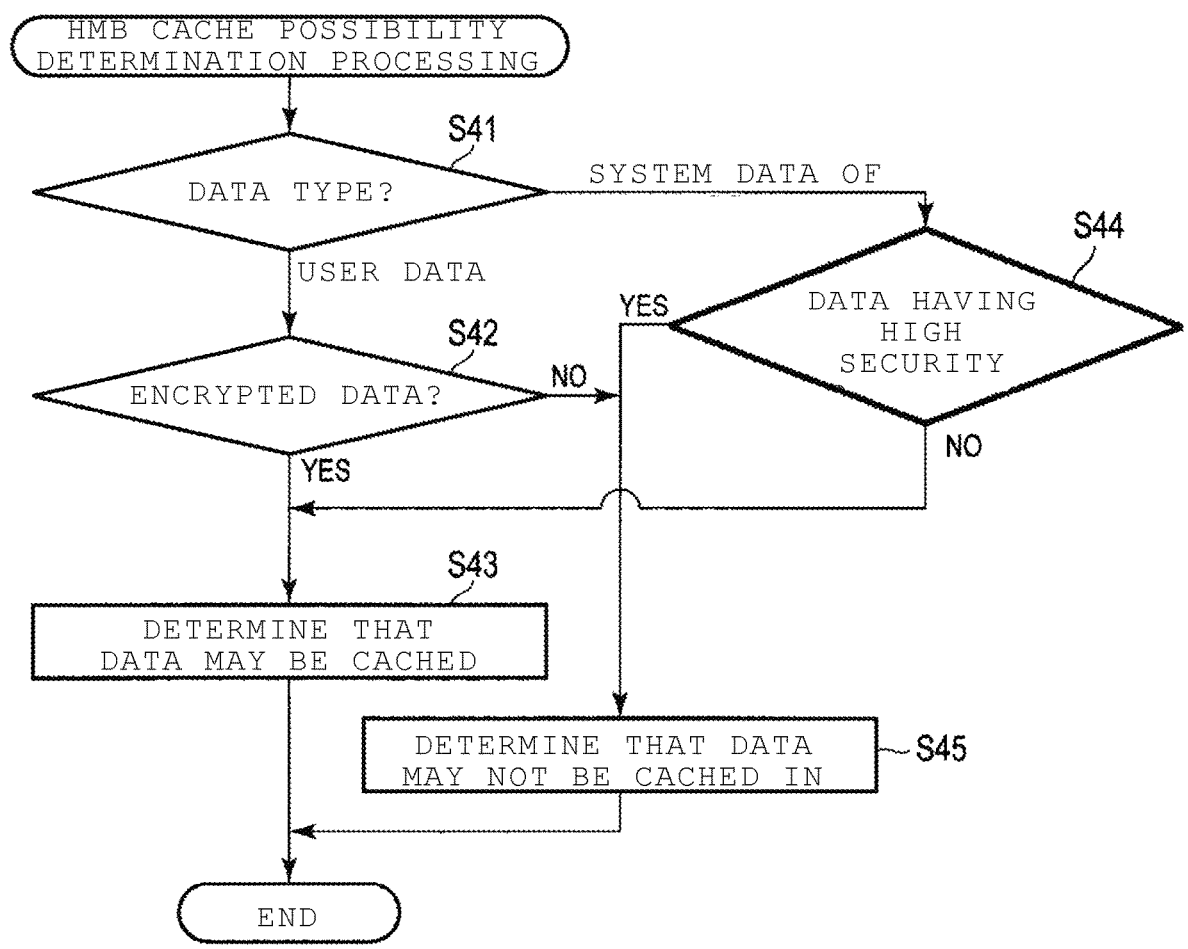
FIG. 17 is a flowchart showing an example of a procedure of HMB cache possibility determination processing executed by the memory system of the embodiment.

Another example of the procedure of cache control processing is shown with reference to the flowcharts of FIGS. 16 and 17. This cache control processing further includes the procedure of HMB cache possibility determination to select which of the internal RAM 14 and the HMB 221 in the host RAM 22 caches the data read from the NAND flash memory 5.

As shown in FIG. 16, the controller 4 determines whether or not data has been read from the NAND flash memory (step S301). The data to be read is user data corresponding to the LBA specified by a read command from the host 2, valid data (that is, user data) in the GC source block, various system data, and the like. When data is not read from the NAND flash memory 5 (NO in step S301), returning to step S301, it is determined again whether or not data has been read from the NAND flash memory 5.

When data is read from the NAND flash memory 5 (YES in step S301), the controller 4 determines whether or not the HMB function is enabled (step S302). When the HMB function is enabled (YES in step S302), the controller 4 performs HMB cache possibility determination processing to determine whether or not the read data (hereinafter, also referred to as read data) is data to be cached in the HMB 221 (step S303). A specific procedure of the HMB cache possibility determination processing will be described later with reference to the flowchart of FIG. 17.

The procedure from step S305 to step S308 performed when the read data is to be cached in the HMB 221 based on the result of the HMB cache possibility determination processing (YES in step S304) is the same as the procedure from step S22 to step S25 described above with reference to the flowchart of FIG. 15.

On the other hand, when the HMB function is not enabled (NO in step S302) or when the read data is data not to be cached in HMB 221 (NO in step S304), the controller 4 determines whether or not there is a free area for caching read data in the internal RAM 14 (step S309). When there is no free area (NO in step S309), the controller 4 creates a free area in the internal RAM 14 according to a specific rule (for example, the LRU method) (step S310). Then, the controller 4 caches the read data in the free area in the internal RAM 14 (step S311) and ends the processing.

As described above, the controller 4 may control so that the read data to be cached in the HMB 221 is cached in the HMB 221 and the read data not to be cached in the HMB 221 is cached in the internal RAM 14.

The flowchart in FIG. 17 illustrates an example of the procedure of the HMB cache possibility determination processing executed by the controller 4. The HMB cache possibility determination processing corresponds to step S303 described above with reference to the flowchart of FIG. 16. Here, the HMB cache possibility determination processing based on the HMB cache possibility determination conditions shown in FIG. 6 is exemplified.

First, the controller 4 determines whether the type of data (read data) read from the NAND flash memory 5 is user data or system data of the SSD 3 (step S41). When the read data is user data (user data in step S41), the controller 4 determines whether or not the read data is encrypted (step S42).

When the read data is encrypted (YES in step S42), the controller 4 determines that the read data is data to be cached in the HMB 221 (step S43) and ends the processing. On the other hand, when the read data is not encrypted (NO in step S42), the controller 4 determines that the read data is data not to be cached in the HMB 221 (step S45) and ends the processing.

When the read data is system data of the SSD 3 (system data of the SSD in step S41), the controller 4 determines whether or not the read data is data with high security priority (step S44). The data with high security priority is, for example, a security key or FW. Also, data with low security priority is, for example, a logical-to-physical address conversion table or an internal log.

When the read data is data with low security priority (NO in step S44), the controller 4 determines that the read data is data to be cached in the HMB 221 (step S43) and ends the processing. On the other hand, when the read data is data with high security priority (YES in step S44), the controller 4 determines that the read data is data not to be cached in the HMB 221 (step S45) and ends the processing.

Thus, the controller 4 may determine whether or not the read data is data to be cached in the HMB 221.

Figure 18:
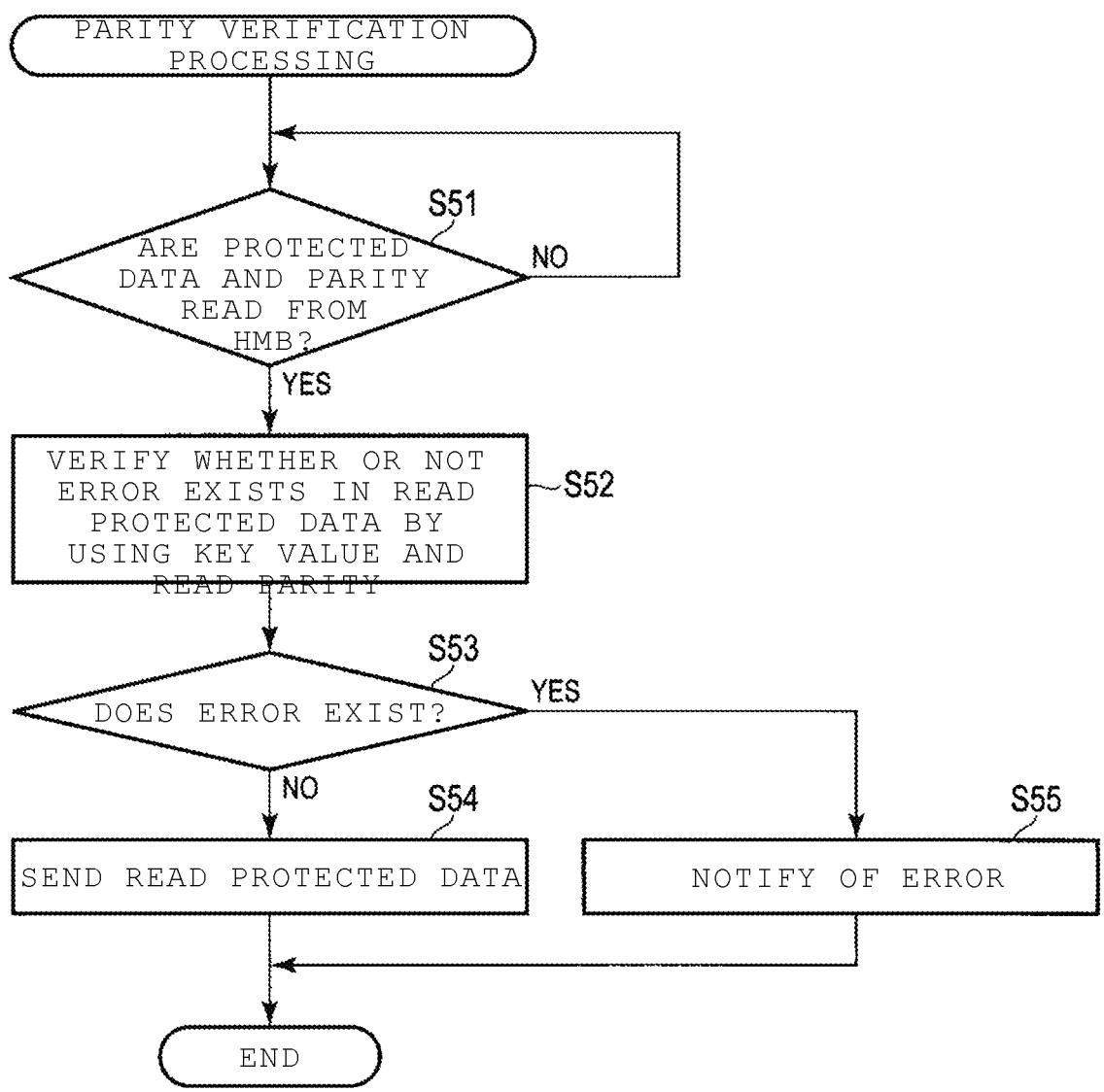
FIG. 18 is a flowchart showing an example of a procedure of parity verification processing executed by the memory system of the embodiment.

The flowchart of FIG. 18 illustrates an example of the procedure of parity verification processing executed by the controller 4.

First, the controller 4 determines whether or not protected data and parity have been read from the HMB 221 (step S51). For example, when protected data and parity are transferred from the HMB 221 to the host interface 11 via the storage interface 23, the controller 4 determines that the protected data and the parity have been read from the HMB 221. When the protected data and the parity are not read from the HMB 221 (NO in step S51), returning to step S51, it is determined again whether or not the protected data and the parity have been read from the HMB 221.

When protected data and parity are read from HMB 221 (YES in step S51), the controller 4 uses the key value stored in the parity checker 113 and the read parity to verify whether or not an error has occurred in the read protected data (step S52). The method of verifying whether or not an error has occurred in the protected data is as described above with reference to FIG. 11.

When no error has occurred in the protected data based on the verification result (NO in step S53), the controller 4 sends the protected data to each unit (for example, the CPU 12) in the controller 4 via the host interface 11 (step S54). Each unit in the controller 4 executes various processing using the sent protected data.

On the other hand, when an error has occurred in the protected data (YES in step S53), the controller 4 notifies each unit in the controller 4 of the error (step S55). The controller 4 discards this protected data. In response to this notification, for example, the controller 4 may read data corresponding to protected data in which an error has occurred from the NAND flash memory 5 again and cache the data in the HMB 221 or the internal RAM 14.

As described above, the controller 4 may verify the protected data stored in the HMB 221 using the key value and the parity added to the protected data.

As described above, according to the present embodiment, security when the HMB is used may be enhanced. The controller 4 of the SSD 3 may use the first area of the host RAM 22 provided in the host 2 as a temporary storage memory of data stored in the NAND flash memory 5 and controls the NAND flash memory 5. The controller 4 generates a first parity by using the first data and the key value stored in the NAND flash memory 5 and stores the first data and the generated first parity in the first area. In the case of reading the first data stored in the first area, the controller 4 reads the first data and the first parity and uses the read first parity and the key value to verify the read first data.

As described above, the controller 4 adds parity to the first data to be stored in the first area in the host RAM 22 using the key value. Therefore, when the first data stored in the first area (that is, the HMB) is damaged or falsified, the controller 4 may detect that an error has occurred in the first data using the key value and the first parity. Therefore, the controller 4 having such a configuration may enhance the security of the SSD 3 when the HMB is used.

Each of the various functions described in the present embodiment may be realized by a circuit (processing circuit). Examples of the processing circuit include a programmed processor, such as a central processing unit (CPU). The processor executes each of the described functions by executing computer programs (instructions) stored in a memory. The processor may be a microprocessor that includes an electrical circuit. Examples of the processing circuit also include digital signal processors (DSPs), application specific integrated circuits (ASICs), microcontrollers, controllers, and other electrical circuitry. Each of the other components besides the CPU described in the present embodiment may also be implemented by the processing circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host that includes a first volatile memory, the system comprising:
a non-volatile memory; and
a controller configured to cause a first area of the first volatile memory to temporarily store data from the non-volatile memory and to generate a key value,
wherein the controller is further configured to:
generate a first parity using first data stored in the non-volatile memory and the generated key value;
cause the first data and the generated first parity to be stored in the first area; and
read the first data and the first parity stored in the first area to verify the read first data using the read first parity and the key value.

2. The memory system according to claim 1, wherein the controller is configured to generate a first key value as the key value in response to receiving, from the host, an instruction to enable the controller to use the first area.

3. The memory system according to claim 2, wherein after receiving, from the host, an instruction to disable the controller to use the first area, the controller is configured to generate a second key value different from the first key value as the key value in response to receiving, from the host, an instruction to enable the controller to use a second area of the first volatile memory.

4. The memory system according to claim 3, wherein the controller is configured to:
generate a second parity using second data stored in the second area and the second key value and cause the second parity to be stored in the second area; and read the second data and the second parity, and then verify the read second data using the read second parity and the second key value.

5. The memory system according to claim 2, wherein in response to receiving, from the host, an instruction to disable the controller to use the first area, the controller is configured to use the first key value as the key value in response to receiving, from the host, an instruction to specify the first area and the data stored in the first area to be used continuously to enable the controller to use the first area.

6. The memory system according to claim 5, wherein the controller is configured to:
generate a third parity using third data stored in the first area and the first key value and cause the third parity to be stored in the first area; and
read the third data and the third parity, and then verify the read third data using the read third parity and the first key value.

7. The memory system according to claim 2, wherein the controller is configured to discard the first data when an error is determined in the read first data.

8. The memory system according to claim 4, wherein each of the first key value and the second key value includes a random number.

9. The memory system according to claim 2, wherein the first key value includes a random number.

10. The memory system according to claim 1, further comprising:
a second volatile memory, wherein
the controller is configured to cause fourth data to be stored in the second volatile memory in response to determining that the fourth data read from the non-volatile memory is not to be stored in the first volatile memory.

11. The memory system according to claim 10, wherein the fourth data includes at least one of unencrypted user data, data of a security key used in the memory system, or data of firmware used in the memory system.

12. The memory system according to claim 2, wherein the instruction to enable the controller to use the first area conforms to a NVM Express standard.

13. The memory system according to claim 2, wherein the instruction to enable the controller to use the first area conforms to a UFS standard.

14. A method, comprising:
reading data from a non-volatile memory;
determining whether an instruction to enable a host volatile memory as a temporary storage area is received;
generating a key value;
generating, in response to receiving the instruction, a parity using the data stored in the non-volatile memory and the generated key value;
causing the data and the generated parity to be stored in an area of the host volatile memory; and
verifying the data using the parity and the key value in response to reading the data stored in the area of the host volatile memory.

15. The method of claim 14, further comprising:
determining, in response to receiving the instruction, whether to store the data and the generated parity in the area of the host volatile memory based on at least one of: a type of the data, encryption of the data, or a security priority of the data.

16. The method of claim 14, further comprising:
storing, in response to not receiving the instruction, the data in an internal volatile memory.

* * * * *